(12) United States Patent
Suresh et al.

(10) Patent No.: US 11,017,597 B2
(45) Date of Patent: *May 25, 2021

(54) SINGULARITY REDUCTION IN QUADRILATERAL MESHES

(71) Applicant: Wisconsin Alumni Research Foundation, Madison, WI (US)

(72) Inventors: Krishnan Suresh, Middleton, WI (US); Chaman S. Verma, Madison, WI (US)

(73) Assignee: WISCONSIN ALUMNI RESEARCH FOUNDATION, Madison, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/457,652

(22) Filed: Jun. 28, 2019

(65) Prior Publication Data
US 2019/0325647 A1 Oct. 24, 2019

Related U.S. Application Data

(63) Continuation of application No. 15/288,929, filed on Oct. 7, 2016, now Pat. No. 10,360,726.

(51) Int. Cl.
G06T 17/20 (2006.01)
G06T 7/13 (2017.01)
G06T 19/00 (2011.01)

(52) U.S. Cl.
CPC .......... *G06T 17/205* (2013.01); *G06T 7/13* (2017.01); *G06T 19/00* (2013.01); *G06T 2200/04* (2013.01); *G06T 2207/20021* (2013.01)

(58) Field of Classification Search
None
See application file for complete search history.

(56) References Cited

U.S. PATENT DOCUMENTS

2002/0045453 A1* 4/2002 Juttner ............... H04M 15/43
455/445
2015/0002510 A1* 1/2015 Takayama ............ G06T 17/205
345/423

OTHER PUBLICATIONS

Attene M. "A lightweight approach to repairing digitized polygon meshes", Vis Computing, vol. 26, pp. 1393-14-6, 2010. (Year: 2010).*
Peng et al, 'Exploring Quadrangulations', ACM Trans. Graph. vol. 33, No. 1, Article 12. (Year: 2014).*
Peng et al, 'A Fast Algorithm to Find All-Pairs Shortest Paths in Complex Networks', Intl. Conf. on Computational Science, vol. 9, pp. 557-566. (Year: 2012).*
Anderson, et al., Automatic All Quadrilateral Mesh Adaption Through Refinement and Coarsening, Proceedings of the 18th International Meshing Roundtable, 2009, pp. 557-574.
(Continued)

*Primary Examiner* — Patrick F Valdez
(74) *Attorney, Agent, or Firm* — Quarles & Brady LLP

(57) ABSTRACT

Systems and methods for modifying and generating quadrilateral meshes for computer graphic structures include obtaining a polygon mesh representing a computer graphic structure, the polygon mesh comprising a plurality of polygonal faces and a plurality of singularities, determining, based on a first singularity of the plurality of vertices, selecting, based on one or more characteristics of the patch, a first minimum singularity template (MST) of a plurality of MSTs each representing a corresponding quadmesh that has three or fewer singularities, and replacing, within the polygon mesh, the patch with the first MST.

17 Claims, 16 Drawing Sheets

(56) References Cited

OTHER PUBLICATIONS

Babuska, et al., Locking Effects in the Finite Element Approximation of Elasticity Problems, Numerische Mathematik, 1992, 62(1):439-463.
BBC Standardmath, [online], [retrieved May 27, 2018], https://web.archive.org/web/20130628114637/http://www.bbc.co.uk/bitesize/standard/maths/i/measure/1ine_angles/facts/revision/6/, 2013.
Bommes et al, "Quad-Mesh Generation and Processing: a survey", State of the Art Report, Eurographics, 2012.
Bommes, et al., Global Structure Optimization of Quadrilateral Meshes, Eurographics, 2011, 30(2):375-384.
Bommes, et al., Mixed-Integer Quadrangulation, ACM Trans. Graph, 2009, 28(3):77:1-77:10.
Bozzo et al, "Adaptive quad mesh simplification", Eurographics Italian Chapter Conference, 2010.
Brewer, et al., The Mesquite Mesh Quality Improvement Toolkit, IMR, 2003, 12 pages.
Bunin G.,"Non-local topological clean-up", In Proceedings of the 15th International Meshing Roundtable, pp. 3-20, Springer, Berlin, Heidelberg, 2006.
Canann, et al., Topological Improvement Procedures for Quadrilateral Finite Element Meshes, Engineering with Computers, 1998, 14(2):168-177.
Derose, et al., Subdivision Surfaces in Character Animation, In Proceedings of the 25th Annual Conference on Computer Graphics and Interactive Techniques, ACM, 1998, pp. 85-94.
Dong, et al., Spectral Surface Quadrangulation, ACM Transactions on Graphics (TOG), ACM, 2006, 25(3):1057-1066.
Ebeida et al, "Q-Tran: A New Approach to Transform Triangular Meshes into Quadrilateral Meshes Locally", Proc. of the 19th International Meshing Roundtable, pp. 23-34, Springer, Berlin, Heidelberg, 2010.
Geuzaine, et al., A Three-Dimensional Finite Element Mesh Generator with Built-In Pre- and Post-Processing Facilities, http://gmsh.info/, GMSH is Copyright 1997-2017 by C. Geuzaine and J-F. Remacle.
Guskov, et al., Topological Noise Removal, 2001 Graphics Interface Proceedings, Ottawa, Canada, 2001, 19, 25 pages.
Halstead, et al., Efficient, Fair Interpolation Using Catmull-Clark Surfaces, In Proceedings of the 20th Annual Conference on Computer Graphics and Interactive Techniques, ACM, 1993, pp. 35-44.
Hormann, et al., Quadrilateral Remeshing, In VMV, 2000, pp. 153-162.
Huang, et al., Spectral Quadrangulation with Orientation and Alignment Control, In IN ACM SIGGRAPH Asia, 2008, 9 pages.
Kalberer, et al., QuadCover—Surface Parameterization Using Branched Coverings, Eurographics, 2007, 26(3):375-384.
Kinney, CleanUp: Improving Quadrilateral Finite Element Meshes, In 6th International Meshing Roundtable, 1997, pp. 437-447.
Knoppel, et al., Globally Optimal Direction Fields, ACM Transactions on Graphics (TOG), 2013, 32(4):59:1-59:10.
Liu et al, "A new method of quality improvement for quadrilateral mesh based on small polygon reconnection", Acta Mech. Sin, 28(1), pp. 140-145, 2012. (Year: 2012).
Marcias et al, "Data-Driven Interactive Quadrangulation", ACM Trans. on Graphics (TOG), 34(4), Aug. 2015.
Owen, et al., Q-Morph: An Indirect Approach to Advancing Front Quad Meshing, International Journal for Numerical Methods in Engineering, 1999, 44:1317-1340.
Pebay, et al., New Applications of the Verdict Library for Standardized Mesh Verification—Pre, Post, and End-to-End Processing, In Proceedings of the 16th International Meshing Roundtable, 2008, pp. 535-552.
Peng et al, "Exploring Quadrangulations", ACM Trans. Graph. vol. 33, No. 1, Article 12, Jan. 2014. (Year: 2014).
Peng, et al., Connectivity Editing for Quad-Dominant Meshes, Eurographics Symposium on Geometry Processing, 2013, 32(5):43-52.
Sandia National Laboratories, CUBIT Geometry and Mesh Generation Toolkit, https://cubit.sandia.gov/, Copyright 1997-2015 Sandia Corporation.
Schaefer, et al., Lofting Curve Networks Using Subdivision Surfaces, Eurographics Symposium on Geometry Processing, 2004, pp. 103-114.
Schuller, et al., Locally Injective Mappings, Eurographics Symposium on Geometry Processing, 2013, 32(5):125-135.
Stam, Flows on Surfaces of Arbitrary Topology, ACM Transactions on Graphics (TOG), 2003, 22(3):724-731.
Takayama et al , "Pattern-Based Quadrangulations for N-Sided Patches", Eurographics Symposium on Geometry Processing, 33(5), 2014.
Takayama et al, "Robust and Controllable Quadrangulation of Triangular and Rectangular Regions", Tech. rep. ETH Zurich, 2013.
Verma, et al., Jaal:Engineering a High Quality All-Quadrilateral Mesh Generator, In Proceedings of the 20th International Meshing Roundtable, 2011, pp. 511-530.

\* cited by examiner

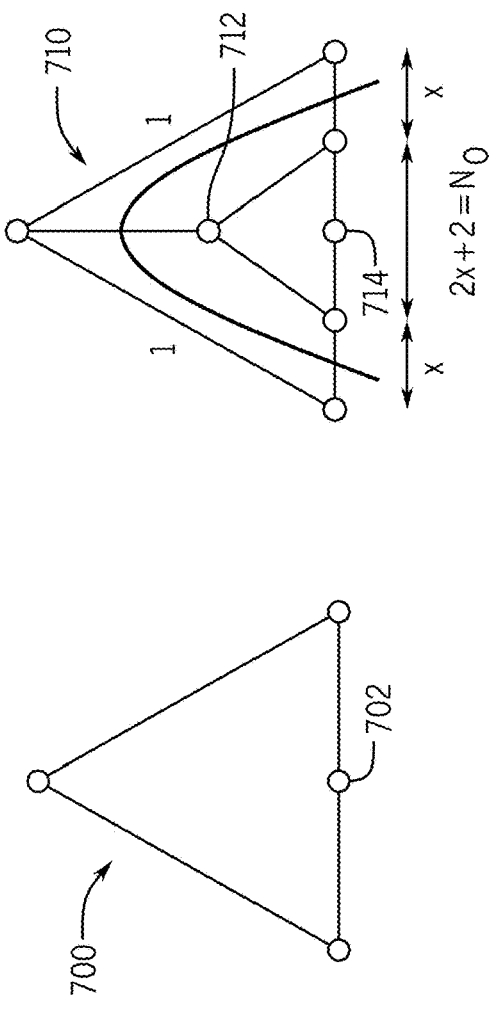
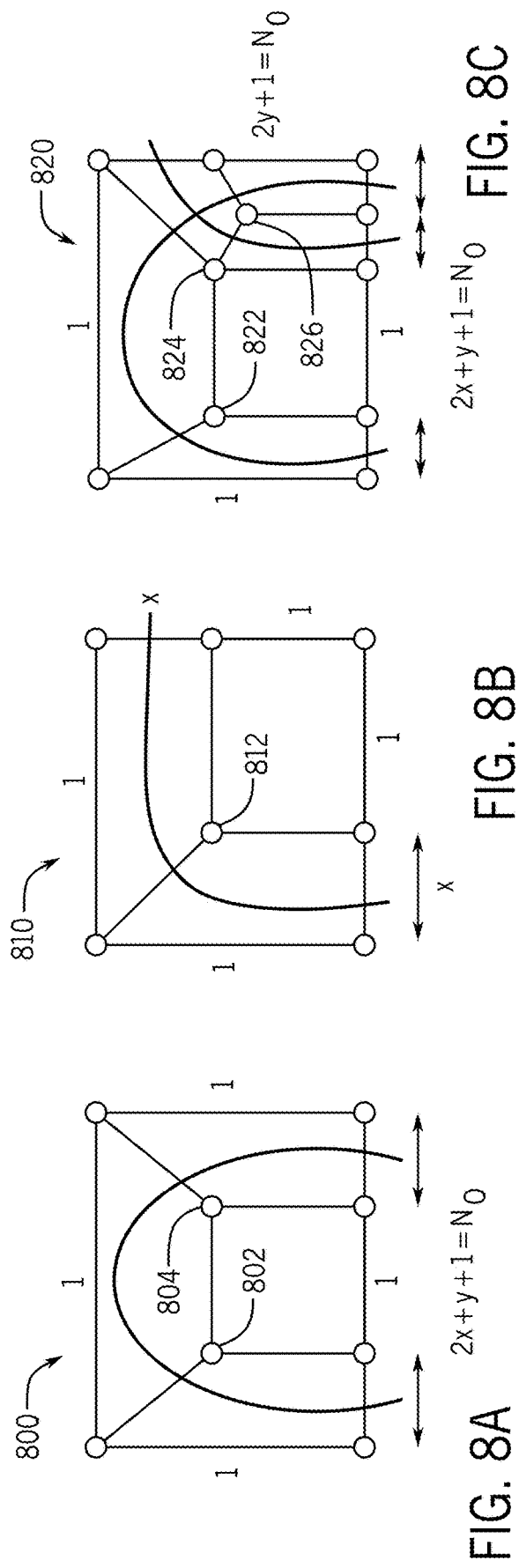
FIG. 7A
FIG. 7B
FIG. 8A
FIG. 8B
FIG. 8C

SINGULARITY REDUCTION IN QUADRILATERAL MESHES

STATEMENT REGARDING FEDERALLY SPONSORED RESEARCH

This invention was made with government support under CMMI1161474 awarded by the National Science Foundation. The government has certain rights in the invention.

CROSS-REFERENCE TO RELATED APPLICATIONS

This application is related to, claims priority to, and incorporates herein by reference in its entirety U.S. patent application Ser. No. 15/288,929, filed Oct. 7, 2016.

BACKGROUND OF THE INVENTION

This disclosure relates generally to methods of optimizing meshes in computer simulations, and more specifically to methods for reducing singularities in quadrilateral meshes.

Use of computer aided design (CAD) tools is common in the engineering industry and also finds use in theatrical animation and graphics. One critical component of CAD tools is the ability to create a three-dimensional collection of polygons, called a "mesh," over a complex structure so that further analysis of the structure can be accomplished. That is, subsequent computing operations may be performed using the mesh as a substitute for the structure.

In 2D, the polygons in a mesh can be any combination of triangles, quadrilaterals, and polygons with five or more sides. In 3D, the mesh can be a combination of tetrahedral and hexahedral elements. There are many applications, especially in non-linear structural mechanics, linear elastic simulations, higher order spectral methods, and texture mapping, which are sensitive to the directions, curvatures, and features on the geometric models. In such applications, an all-quadrilateral and all-hexahedral mesh is often preferred over a triangular mesh. A good quadrilateral mesh is characterized by both topological and geometric quality metrics. Geometric quality is measured from metrics such as aspect ratio, min/max angles, area, etc. Topological quality is measured by regularity in vertex distribution. An internal vertex is considered "regular" if it has four incident edges, otherwise it is a "singular" node, or a "singularity."

The Gauss-Bonnet theorem states that all surfaces with positive genus must have singularities. In addition, singularities are essential in controlling distortions near bifurcations, protrusions, cavities etc. and in abrupt shape transitions. However, singularities in mesh could lead to (1) numerical instability in computational fluid dynamics (CFD) applications (2) wrinkles in subdivision surfaces, (3) irrecoverable element inversions near concave boundaries, (4) helical patterns, (5) visible seams in texture maps, and (6) breakdown of structured patterns on manifolds. Therefore, the major challenges in producing high-quality quad and hex mesh generators are usually related to minimization and placement of singularities.

There are several automatic mesh generators that can produce a high geometric quality mesh. However, the resulting mesh is typically of low topological quality—specifically, the mesh is not optimized with respect to singularities—which is detrimental in the downstream analysis or graphics applications. There are no known techniques to create meshes with both high geometric and high topological qualities, but having such a mesh is critical to producing the fastest, and most accurate, finite element analysis (FEA). Similarly, there are several techniques today that assist in mesh improvement, mesh refinement and mesh simplification. However, while these yield meshes with acceptable geometric quality, they provide very limited control over topological quality.

Further, quad and hex meshes are inherently global in nature: a single modification to their topology can have a domino effect, in that a large number of elements may have to undergo modifications to keep the mesh consistent. The non-localness compounds difficulties in the automation of quad mesh generation and editing, as various quality criteria have non-linear dependencies which can be extremely hard to encode and solve. Furthermore, it is also impossible to refine, coarsen, or edit a quad mesh with local operations, as they create additional singularities. For all these reasons, quad and hex meshing problems are often formulated as global optimization problems. Unfortunately, these optimizations are expensive, and their parametric tweaking is non-intuitive. There is no direct intuitive connection between the user constraints and the resulting mesh topology.

While there have been some significant developments in automatic quadrilateral mesh generation, a robust framework for addressing both geometric and topological quality is needed. Therefore, the purpose of this disclosure is to provide a methodology for reducing singularities in a quadrilateral mesh without loss of geometric quality.

SUMMARY OF THE INVENTION

The present invention overcomes the aforementioned drawbacks by providing a simple and robust method to reduce singularities in a given quad mesh. The main idea is to replace sub-meshes containing a large number of singularities with Minimum Singularity Templates. This process is applied repeatedly while maintaining desired geometric quality.

In one aspect, the disclosure provides a method of optimizing a computer graphic structure. The method includes: receiving a polygon mesh associated with the structure, the polygon mesh comprising a plurality of polygonal faces and a plurality of vertices each located at an intersection of at least two of the faces, the plurality of vertices including a plurality of singularities at which more or less than four of the faces intersect; receiving a criterion for ranking the plurality of singularities; determining, using the criterion, that a first singularity of the plurality of singularities is the highest ranking singularity; identifying, using a shortest path algorithm, that a second singularity of the plurality of singularities is topologically closest, of the plurality of singularities within the polygon mesh, to the first singularity; identifying, using a breadth-first search of the plurality of vertices that begins at a first vertex disposed between the first singularity and the second singularity, a third singularity of the plurality of singularities; determining a patch of the polygon mesh, the patch containing the first singularity, the second singularity, and the third singularity and having a first boundary formed by a plurality of sides each defined by one or more of a plurality of edges between two of the plurality of faces, and a plurality of convex corners each defined by a corresponding vertex of the plurality of vertices, each of the convex corners located at the intersection of two of the plurality of sides; determining a first minimum number of singularities that must be located within the patch; selecting, based on the first minimum number of singularities, a first minimum singularity template (MST) of a plurality of MSTs each representing a corresponding quadmesh; and replacing, within the polygon mesh, the patch with the first MST.

Determining the first minimum number of singularities for the patch may include: dividing the patch into a plurality of sub-patches, wherein a first sub-patch of the plurality of sub-patches is a maximally reduced patch (MRP) having a second boundary with an even number of the plurality of edges and a first MRP side defined by exactly one of the plurality of edges, and each other of the plurality of sub-patches are quadrilateral and each contain a corresponding quadmesh that has no singularities; and determining, as the first minimum number of singularities for the patch, a second minimum number of singularities that must be located within the first sub-patch. Selecting the first MST may include determining that the patch is quadrangulable with only one singularity. Selecting the first MST may alternatively include determining whether the patch is triangular or quadrilateral and selecting the first MST from the plurality of MSTs comprising: a first triangular MST for a triangular patch, the first triangular MST having one internal singularity; a second triangular MST for the triangular patch, the second triangular MST having two internal singularities; a first quadrilateral MST for a quadrilateral patch, the first quadrilateral MST having two internal singularities; a second quadrilateral MST for the quadrilateral patch, the second quadrilateral MST having one internal singularity; and, a third quadrilateral MST for the quadrilateral patch, the third quadrilateral MST having three internal singularities. Replacing the patch with the first MST may include: creating a correspondence between each corner of a plurality of corners of the MST with a corresponding convex corner of the plurality of convex corners of the patch; calculating a set of coordinates for each quadmesh vertex of a plurality of quadmesh vertices of the first MST; overlaying, using the correspondence between corners and the sets of coordinates, the quadmesh of the first MST onto the polygon mesh; and applying a locally injective mapping to each inverted face of a plurality of faces of the quadmesh to produce a fold-free mesh in which each of the plurality of faces has a positive Jacobian.

In another aspect, the present disclosure provides a method that includes: obtaining a polygon mesh representing a computer graphic structure, the polygon mesh comprising a plurality of polygonal faces and a plurality of vertices each located at an intersection of at least two of the faces, wherein some of the plurality of vertices are singularities; determining, based on a first singularity of the plurality of vertices, a patch of the polygon mesh, the patch containing the first singularity and having a first boundary; selecting, based on one or more characteristics of the patch, a first minimum singularity template (MST) of a plurality of MSTs each representing a corresponding quadmesh that has three or fewer singularities; and replacing, within the polygon mesh, the patch with the first MST. Obtaining the polygon mesh may include: generating a triangular mesh for the structure; subdividing each triangle in the triangular mesh into three quadrilaterals to produce a quadmesh with no singularities; and adding one or more layers of new quadrilaterals into the quadmesh, thus producing the vertices that are singularities.

Determining the patch may include identifying, as a second singularity, the vertex of the plurality of vertices that is the topologically closest singularity to the first singularity, the patch containing the second singularity. Identifying the second singularity may include performing a Dijkstra shortest distance search from the first singularity. Determining the patch may further include identifying, using a breadth-first search of the plurality of vertices that begins at a first vertex disposed between the first singularity and the second singularity, a third singularity of the plurality of vertices, the patch containing the third singularity. Selecting the first MST may include dividing the patch into a plurality of sub-patches, wherein a first sub-patch of the plurality of sub-patches is a maximally reduced patch (MRP) having an even number of edges and a first side defined by exactly one of the even number of edges, and selecting the first MST based at least in part on the first sub-patch.

Selecting the first MST may include determining whether the patch is triangular or quadrilateral, and selecting the first MST from the plurality of MSTs comprising: a first triangular MST for a triangular patch, the first triangular MST having one internal singularity; a second triangular MST for the triangular patch, the second triangular MST having two internal singularities; a first quadrilateral MST for a quadrilateral patch, the first quadrilateral MST having two internal singularities; a second quadrilateral MST for the quadrilateral patch, the second quadrilateral MST having one internal singularity; and a third quadrilateral MST for the quadrilateral patch, the third quadrilateral MST having three internal singularities.

Replacing the patch with the first MST may include: aligning each corner of a plurality of corners of the first MST with a corresponding convex corner of a plurality of convex corners of the patch; calculating a set of coordinates for each quadmesh vertex of a plurality of quadmesh vertices of the first MST; and overlaying, using the correspondence between corners and the sets of coordinates, the quadmesh of the first MST onto the polygon mesh. Obtaining the polygon mesh may include: receiving a quad-dominant mesh comprising a plurality of quadrilaterals and a plurality of non-quadrilateral elements; converting the quad-dominant mesh into a triangular mesh; matching dual edges of the triangular mesh; and forming the polygon mesh from triangles of the triangular mesh that are paired from dual edges.

In another aspect, the present disclosure provides a method for optimizing a computer graphic structure. The method includes: obtaining, by a computing device, a first polygon mesh representing the computer graphic structure, the polygon mesh comprising a plurality of polygonal faces and a plurality of vertices each located at an intersection of at least two of the faces, the plurality of vertices including a plurality of singularities; identifying a first singularity of the plurality of singularities; identifying, using the first singularity, a second polygon mesh comprising a first subset of the plurality of faces and containing the first singularity, a second singularity of the plurality of singularities, and a third singularity of the plurality of singularities; selecting, based on one or more characteristics of the second polygon mesh, a first minimum singularity template (MST) that corresponds to a third polygon mesh comprising a plurality of quadrilateral faces and having three or fewer singularities; and replacing, within the first polygon mesh, the second polygon mesh with the third polygon mesh.

Obtaining the first polygon mesh may include: generating a fourth polygon mesh for the structure, the fourth polygon mesh comprising a plurality of triangular faces; subdividing each triangular face in the fourth polygon mesh into three quadrilaterals to produce a quadmesh with no singularities; and adding one or more layers of new quadrilaterals into the quadmesh to produce the first polygon mesh. Identifying the second polygon mesh may include identifying, as the second singularity, the vertex of the plurality of vertices that is the topologically closest singularity to the first singularity. Identifying the second singularity may further include performing a Dijkstra shortest distance search from the first singularity. Identifying the second polygon mesh further includes identifying the third singularity using a breadth-first search of the plurality of vertices that begins at a first vertex disposed between the first singularity and the second singularity. Selecting the first MST may include: dividing the second polygon mesh into a plurality of sub-patches, wherein a first sub-patch of the plurality of sub-patches is a maximally reduced patch (MRP) having an even number of edges and a first side defined by exactly one of the even number of edges; and selecting the first MST based at least in part on the first sub-patch.

The foregoing and other aspects and advantages of the invention will appear from the following description. In the description, reference is made to the accompanying drawings that form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

FIGS. 7A-B are diagrams of exemplary minimum singularity templates for a triangular patch.

FIGS. 8A-C are diagrams of exemplary minimum singularity templates for a quadrilateral patch.

DETAILED DESCRIPTION OF THE INVENTION

Figure 1:
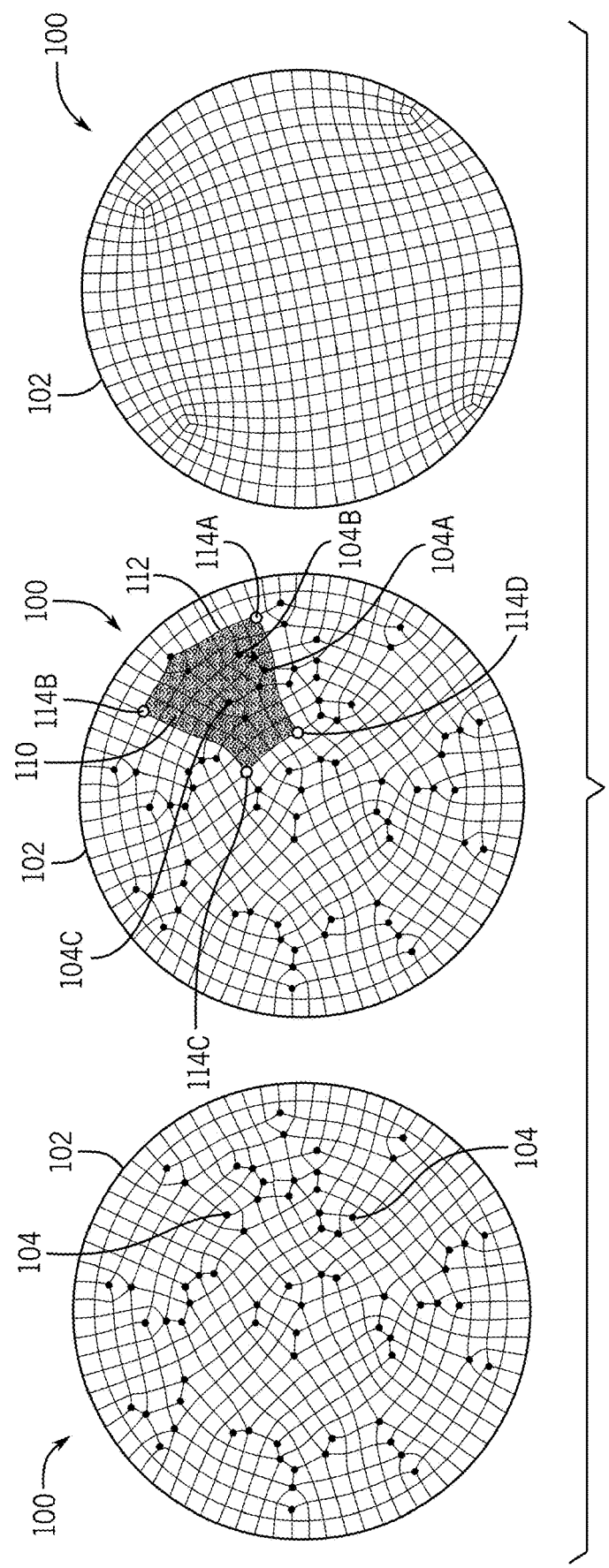
FIG. 1 is a diagram of an exemplary mesh optimization for a computer graphic structure in accordance with the present disclosure.

Described here are systems and computer-implemented methods for modifying and generating polygonal meshes in computer graphics applications, which meshes are both geometrically and topologically optimized. Topological optimization is achieved by reducing singularities in the mesh. Generally, with reference to FIG. 1, the user provides, or the system generates a rule for ranking singularities 104 within a quadrilateral mesh 102 of an object 100 (e.g., distance of a singularity 104 from the boundary 106, role of singularity 104 in geometric distortion of the mesh 102). Thereafter, these singularities 104 are sorted and incrementally removed as follows. At least three singularities 104 are needed to participate in the removal process; this leads to the idea of exploiting "patch," which is a well-known structure in mesh generation in various contexts. The present disclosure uses a patch 110 as a subset of the mesh 102 containing at least three singularities 104A-C. Starting with three nearby singularities, additional elements (vertices, edges, surfaces, and/or polygons) are incrementally added to the patch 110, while maintaining certain desirable properties of the patch 110, described below.

One such property is that the boundary 112 of the patch 110 must contain at least 3 topologically convex corners 114A-D; FIG. 1 illustrates a patch 110 with four such corners 114A-D. Once such a patch 110 has been created, the elements within this patch 110 are replaced by a new set of elements with fewer singularities, using the Minimum Singularity Template (MST). A smoothing step is then carried out to improve the geometric quality. The process is then repeated, starting from three new singularities, until no new patches can be constructed, resulting in an optimized quad mesh 150. While the entire process can be automated, it is also amenable to user interactions, in that specific singularities can be identified and removed at any stage.

The present methods employ the following geometric definitions, among others, for identifying singularities to be removed and constructing patches to remove the singularities.

The "valence" of a vertex $v_i$ is the number of edges incident on the vertex. A vertex with "n" valence is denoted by Vn. An internal vertex with valence 4 is considered regular, otherwise it is an irregular vertex, or "singularity." An internal vertex with valence 2 is called a doublet. In some embodiments, the present methods may be used to address V3 and V5 singular nodes, as all other high valence nodes can be converted into V3 and V5 nodes using standard atomic face open or face close operation.

Figure 2A:
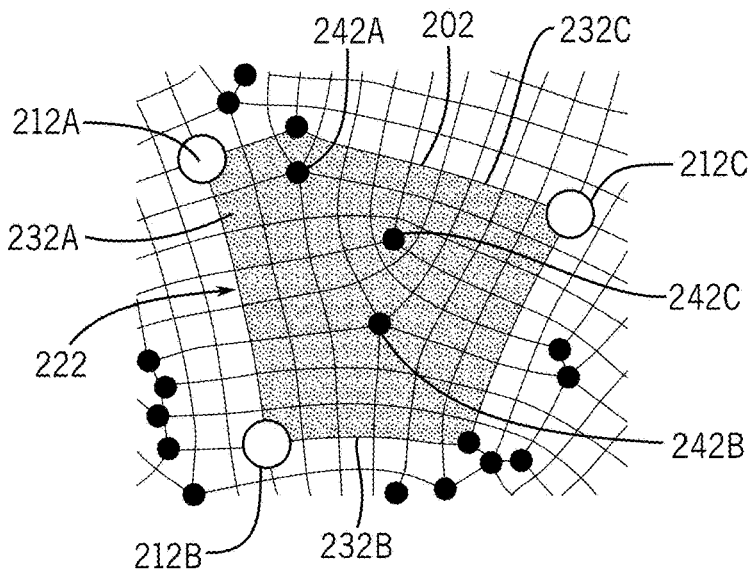
FIG. 2A is a diagram of an exemplary three-sided patch in accordance with the present disclosure.
Figure 2B:
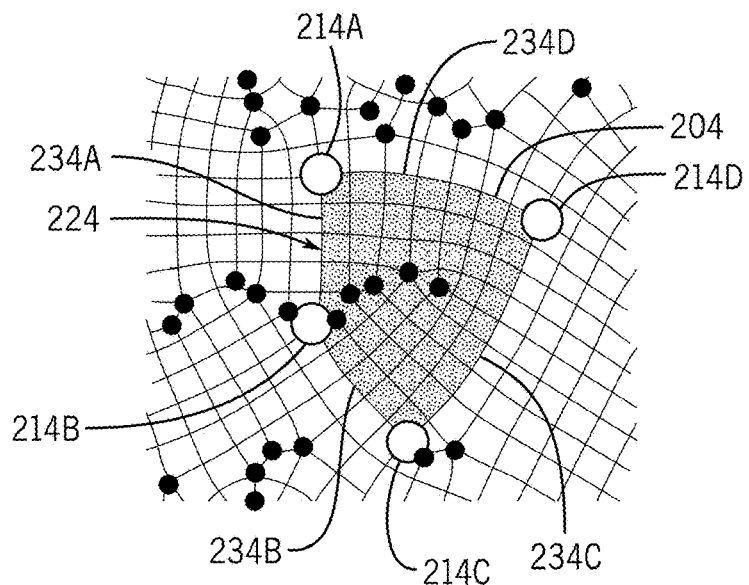
FIG. 2B is a diagram of an exemplary four-sided patch in accordance with the present disclosure.
Figure 2C:
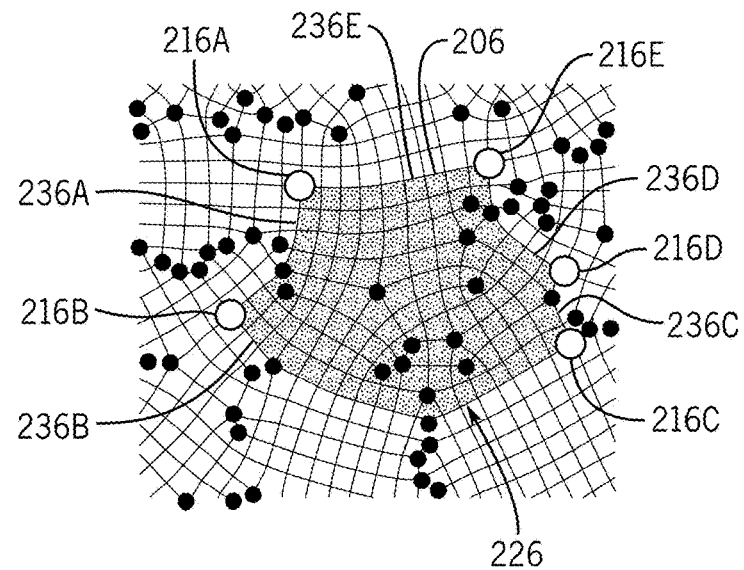
FIG. 2C is a diagram of an exemplary five-sided patch in accordance with the present disclosure.

A "patch" is a sub-mesh with disc topology. The topological outer angle of a vertex on the boundary of a patch (TOA(V)) is defined as the number of faces incident on the vertex that lie outside of the patch, minus two. A vertex on the boundary of a patch is a "convex corner" if its TOA is greater than or equal 1. FIGS. 2A-C illustrate an exemplary three-sided patch 202, four-sided patch 204, and five-sided patch 206, all containing singularities and demonstrating that the corresponding convex corners 212A-C, 214A-D, 216A-E of each patch 202, 204, 206 naturally divide the boundaries 222, 224, 226 of each patch into "sides" 232A-C, 234A-D, 236A-E of equal number to the number of convex corners.

Nevertheless, the number of quad edges on the boundary of a patch, and thus the number of quads defining the boundary, is even. This is shown by a quad mesh M, which is locally homeomorphic to an open subset of $R^2$, the number of faces and edges must satisfy $4F=2E_i+E_b$, where $E_i$ is the number of internal edges shared by two faces, and $E_b$ is the number of boundary edges shared by one face. This equation implies that $E_b$ must be even, and confirms the existence of a quad mesh in a patch. The present disclosure provides a constructive algorithm to create an alternate quadrangulation with fewer singularities. Any quadrangulation of a patch with k convex corners will have at least $|k-4|$ interior singularities. For example, there are 3 interior singularities 242A-C in FIG. 2A; all quadrangulation of the patch must contain at least one singularity.

Figure 3:
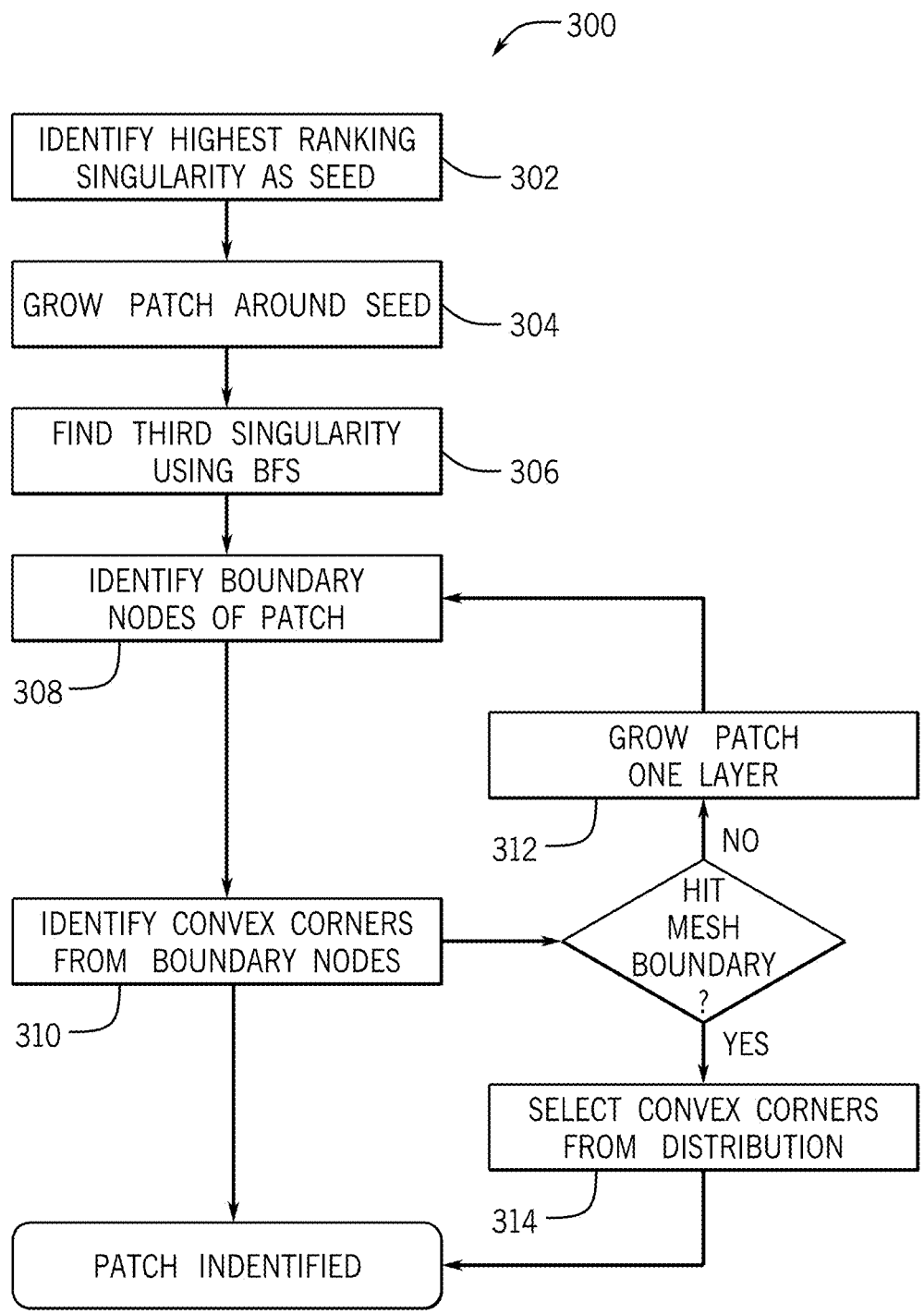
FIG. 3 is a flowchart of a method of identifying a patch in accordance with the present disclosure.
Figure 4:
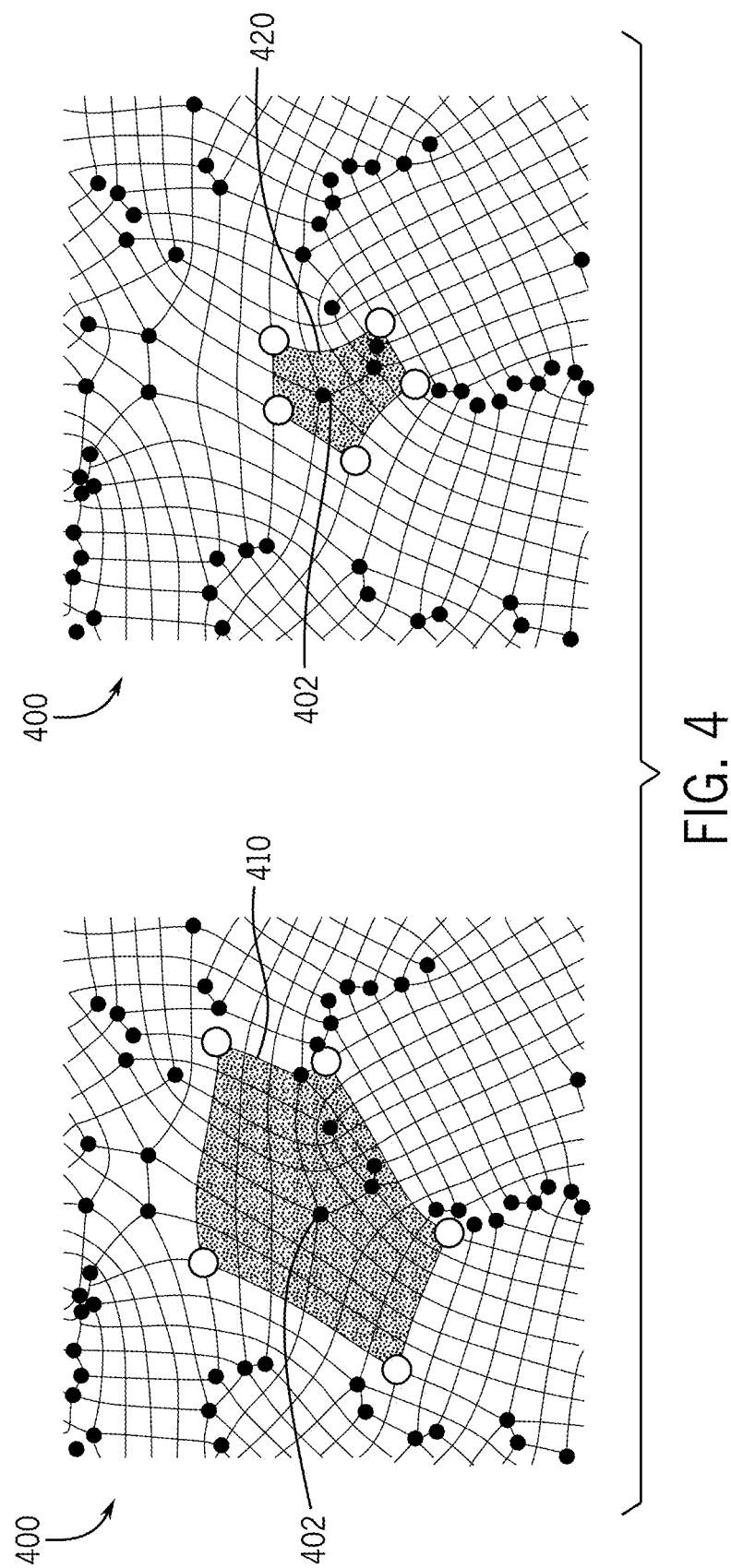
FIG. 4 is a diagram comparing a patch identified using an existing algorithm with a patch identified using an algorithm in accordance with the present disclosure.

Referring to FIG. 3, upon receiving the user-specified or automatically generated criterion for ranking the singularities in the domain, a computer system may perform a method 300 for identifying the patches for the mesh. At step 302, the system may determine the highest ranking singularity, which becomes the seed for the patch expansion. At step 304, the system may grow the patch around the seed. In some embodiments, the patch expansion may be governed by a breadth-first search (BFS) using one modified heuristic: in light of the requirement for at least three singularities in a patch, the system may, instead of searching in all directions (as in classic BFS), search for one more singularity which is topologically closest to the seed using Dijkstra's shortest path algorithm or a similar algorithm. As shown in FIG. 4, for the same mesh 400 and seed singularity 402, this simple change creates a compact and thinner patch 420 compared to the patch 410 created from classic BFS alone.

Referring again to FIG. 3, at step 306, after identifying two singularities, the system may search for a third singularity using BFS starting from the vertices connecting the first two singularities. At step 308, the boundary vertices of the patch are identified, and at step 310 their topological angles are computed determine whether any of the boundary vertices are convex corners. If there are more than five convex corners, the system may select only five of them. If convex corners are not found, at step 312 the entire patch is expanded by one layer. If the expansion reaches the mesh boundary, further expansion is halted. If the expansion reaches the mesh boundary and no corners are found based on topological angle criterion, at step 314 the system may choose the corners from the uniformly distributed boundary vertices of the patch. In some cases, this may create doublets at the corners, which must be removed immediately after remeshing the patch.

The system may then commence quadrangulation of the patch to achieve minimum singularities therein. Obtaining the least number of singularities in a patch is a constraint-satisfying linear problem, for which a solution exists only for patches which have a specific number of edges on their sides. Whereas for a quad patch, zero singularity is obtained when the number of edges on opposite sides are equal, for other polygonal patches, a linear system derived from an "interval matching" method must be solved.

Figure 5B:
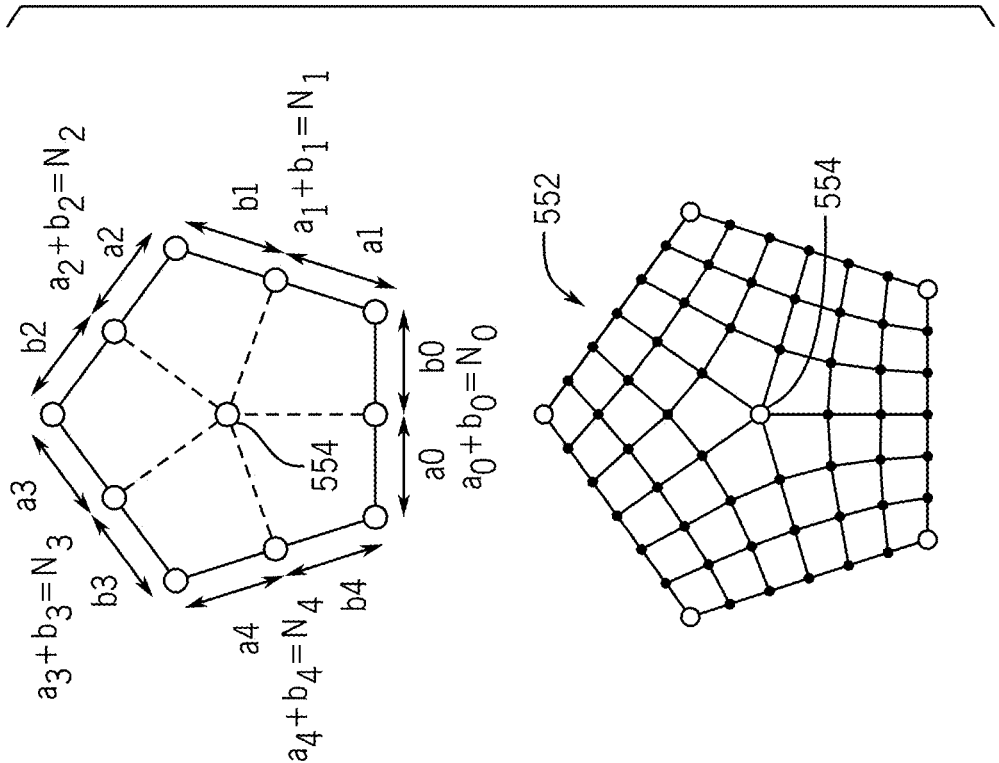
FIG. 5B is a diagram of a pentagonal quadmesh patch.
Figure 5A:
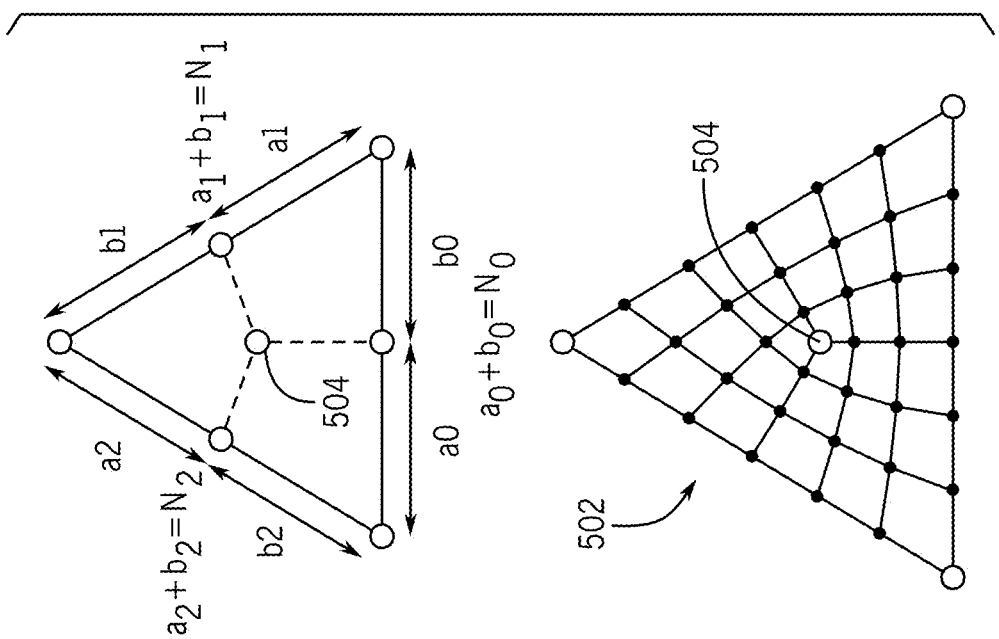
FIG. 5A is a diagram of a triangular quadmesh patch.

The interval matching for a triangle patch leads to the system of equations of Table 1. Referring to FIG. 5A, if there exists an integer solution to this system, then a triangle patch 502 can be quadrangulated with a single V3 singularity 504 inside the patch 502. In this figure, $a_0$, $b_0$, . . . denote the number of quad edges on the patch segments. The interval matching for a pentagonal patch leads to the system of equations of Table 2. Referring to FIG. 5B, if there exists an integer solution to this system, then a pentagonal patch 552 can be quadrangulated with a single V5 singularity 554 inside the patch 552. Again, $a_0$, $b_0$, . . . denote the number of quad edges on the patch segments.

TABLE 1

Linear System of Equations for Triangle Patch $$\begin{pmatrix} 1 & 0 & 0 & 1 & 0 & 0 \\ 0 & 1 & 0 & 0 & 1 & 0 \\ 0 & 0 & 1 & 0 & 0 & 1 \\ 1 & 0 & 0 & 0 & -1 & 0 \\ 0 & 1 & 0 & 0 & 0 & -1 \\ 0 & 0 & 1 & -1 & 0 & 0 \end{pmatrix} \begin{bmatrix} a_0 \\ a_1 \\ a_2 \\ b_0 \\ b_1 \\ b_2 \end{bmatrix} = \begin{pmatrix} N_0 \\ N_1 \\ N_2 \\ 0 \\ 0 \\ 0 \end{pmatrix} \iff \begin{matrix} a_0 + b_0 = N_0 \\ a_1 + b_1 = N_1 \\ a_2 + b_2 = N_2 \\ a_0 - b_1 = 0 \\ a_1 - b_2 = 0 \\ a_2 - b_0 = 0 \end{matrix}$$

TABLE 2

Linear System of Equations for Pentagon Patch $$\begin{pmatrix} 1 & 0 & 0 & 0 & 0 & 1 & 0 & 0 & 0 & 0 \\ 0 & 1 & 0 & 0 & 0 & 0 & 1 & 0 & 0 & 0 \\ 0 & 0 & 1 & 0 & 0 & 0 & 0 & 1 & 0 & 0 \\ 0 & 0 & 0 & 1 & 0 & 0 & 0 & 0 & 1 & 0 \\ 0 & 0 & 0 & 0 & 1 & 0 & 0 & 0 & 0 & 1 \\ 1 & 0 & 0 & 0 & 0 & 0 & 0 & -1 & 0 & 0 \\ 0 & 1 & 0 & 0 & 0 & 0 & 0 & 0 & -1 & 0 \\ 0 & 0 & 1 & 0 & 0 & -1 & 0 & 0 & 0 & 0 \\ 0 & 0 & 0 & 1 & 0 & 0 & -1 & 0 & 0 & 0 \\ 0 & 0 & 0 & 0 & 1 & 0 & 0 & -1 & 0 & 0 \end{pmatrix} \begin{bmatrix} a_0 \\ a_1 \\ a_2 \\ a_3 \\ a_4 \\ b_0 \\ b_1 \\ b_2 \\ b_3 \\ b_4 \end{bmatrix} = \begin{pmatrix} N_0 \\ N_1 \\ N_2 \\ N_3 \\ N_4 \\ 0 \\ 0 \\ 0 \\ 0 \\ 0 \end{pmatrix} \iff \begin{matrix} a_0 + b_0 = N_0 \\ a_1 + b_1 = N_1 \\ a_2 + b_2 = N_2 \\ a_3 + b_3 = N_3 \\ a_4 + b_4 = N_4 \\ a_0 - b_3 = 0 \\ a_1 - b_4 = 0 \\ a_2 - b_0 = 0 \\ a_3 - b_1 = 0 \\ a_4 - b_2 = 0 \end{matrix}$$

If solving either system of linear equations leads to integer values to all the $a_i$ and $b_i$, then the patch can be remeshed with only one singularity in the interior (and vice versa). The inversions of these matrices are pre-calculated; the main objective becomes finding the minimum number of singularities within a patch. An exhaustive search is infeasible except for small patch sizes. Therefore, the system may first divide a given patch into sub-patches. One of the sub-patches, which is referred to herein as the Maximally Reduced Patch (MRP), has one or more sides with only one edge, and all other sub-patches are 4-sided (i.e., quadrilateral) with perfect quadmeshes (i.e., no singularity).

Figure 6B:
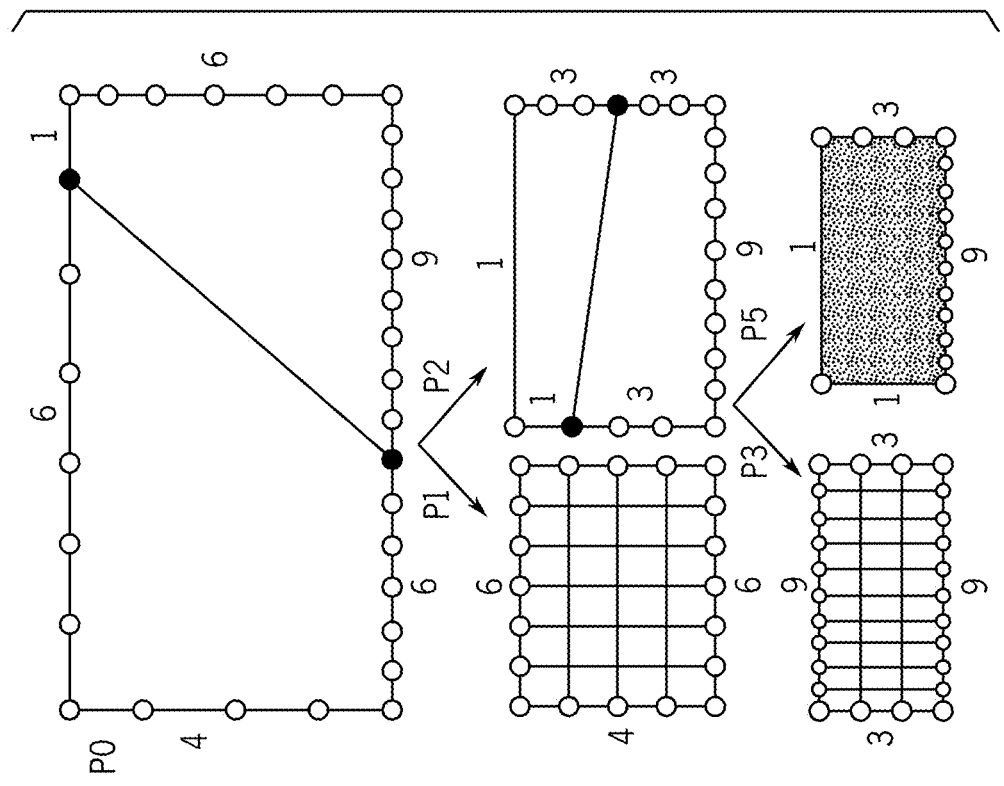
FIG. 6B is a diagram of a maximal patch reduction of a quadrilateral patch in accordance with the present disclosure.
Figure 6A:
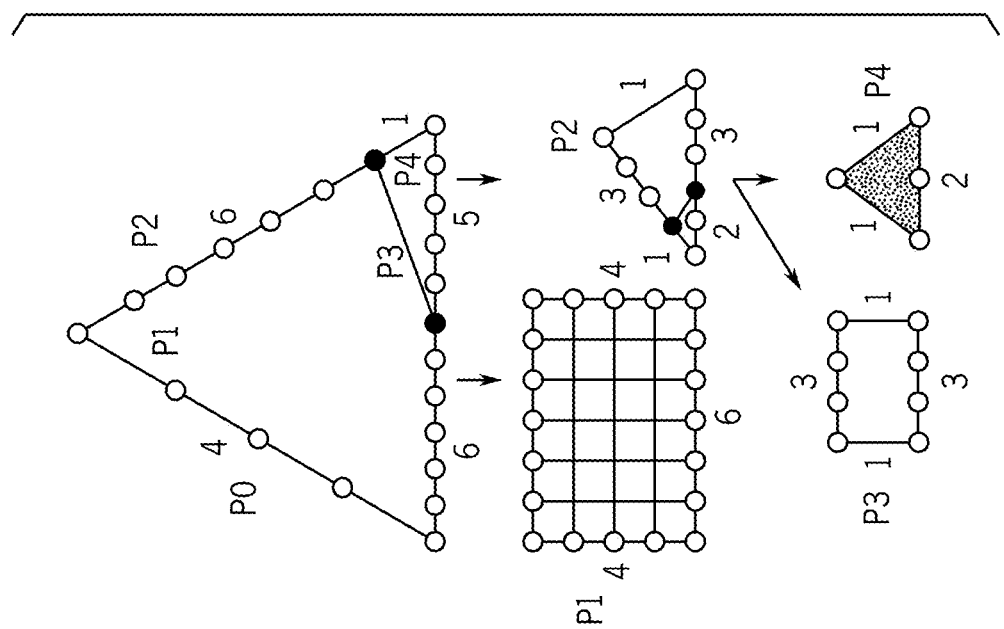
FIG. 6A is a diagram of a maximal patch reduction of a triangular patch in accordance with the present disclosure.

Referring to FIG. 6A, to find the MRP for a triangle patch $P=P(N_0,N_1,N_2)$, where $N_k$ denotes the number of quad edges on the kth side, the system may rearrange the triangle so that $N_0 \geq N_1 \geq N_2$. Then, the patch $P_0$ is divided into sub-patches $P_1$ and $P_2$ according to the system:

$$m_1 = \min(N_0, N_1) - 1$$

$$P_0(N_0, N_1, N_2) = P_1(m_1, N_2, m_1, N_2) + P_2(N_0 - m_1, 1, N_2).$$

The sub-patch $P_1$ leads to a perfect quad mesh, and the second side of the sub-patch $P_2$ has only one edge. Sub-patch $P_2$ may be further reduced into sub-patches $P_3$ and $P_4$:

$$m_2 = \min(N_0 - m_1, N_2) - 1$$

$$P_2(N_0 - m_1, 1, N_2) = P_3(m_2, 1, m_2, 1) + P_4(N_0 - m_1 - m_2, 1, 1).$$

With the second decomposition, the sub-patch $P_3$ will lead to a perfect quadmesh and $P_4$ has only edge on its second and third side. This forms the MRP for a given triangular $P_0$ patch. With these decompositions, finding the minimum number of singularities in the $P_0$ patch is reduced to finding minimum number of singularities in the sub-patch $P_4$. Sub-patch $P_4$ has an even number of edges on its boundary, and thus is a quadrilateral patch that can be quadrangulated as discussed below with respect to FIG. 6B.

Referring to FIG. 6B, to find the MRP for a quadrilateral patch $P=P(N_0,N_1,N_2,N_3)$, where $N_k$ denotes the number of quad edges on the kth side, the system may rearrange the patch so that $N_0 \geq N_2$ and $N_1 \geq N_3$. Then, the patch $P_0$ is decomposed in two directions. The first decomposition is done with a vertical cut to provide two sub-patches $P_1$ and $P_2$, wherein $P_1$ contains a perfect quadmesh, but the patch $P_2$ has only one edge on its top side:

$$m_1 = \min(N_0, N_2) - 1$$

$$P_0(N_0,N_1,N_2,N_3) = P_1(m_1,N_3,m_1,N_3) + P_2(N_0-m_1,N_1,1,N_3).$$

The second decomposition may be performed with a horizontal cut on P2 to produce two sub-patches P3 and P4. The sub-patch P3 may contain a perfect quadmesh and the patch P4 has its left and top sides each containing one edge. This forms the MRP of the original quad patch P0:

$$m_2 = \min(N_1, N_3) - 1$$

$$P_2(N_0-m_1,N_1,1,N_3) = P_3(N_0-m_1,m_2,N_0-m_1,m_2) + P_4(N_0-m_1,N_2-m_2,1,1).$$

With these two decompositions, finding the minimum singularities in the original patch P0 is reduced to finding the minimum singularities in the patch P4. The quadrangubility of P4 is guaranteed, as it contains an even number of edges. It is further noted that a pentagon can be decomposed into a quad and a triangle, or three triangles in various ways. Each triangle and quad patch can be quadrangulated with the methods described above.

Once any triangular, quadrilateral, or pentagonal patch is decomposed into sub-patches to find the MRP, one or more minimum singularity templates (MSTs) may be selected to correspond to the MRP. Referring to FIGS. 7A-B, there are two MSTs for a triangular patch, having at most two singularities: a first MST 700, referred to in this text as a $T_1$ type, has only one singularity 702; a second MST 710, referred to herein as a $T_2$ type, has only two singularities 712, 714. Referring to FIGS. 8A-C, there are three MSTs for a quadrilateral patch, having at most three singularities: a first MST 800, referred to in this text as a $Q_1$ type, has only one singularity 802; a second MST 810, referred to in this text as a $Q_2$ type, has one singularity 812; and, a third MST 820, referred to in this text as a $Q_3$ type, has three singularities 822, 824, 826. Using these MSTs, a pentagon patch can be quadrangulated with four singularities.

Figure 9:
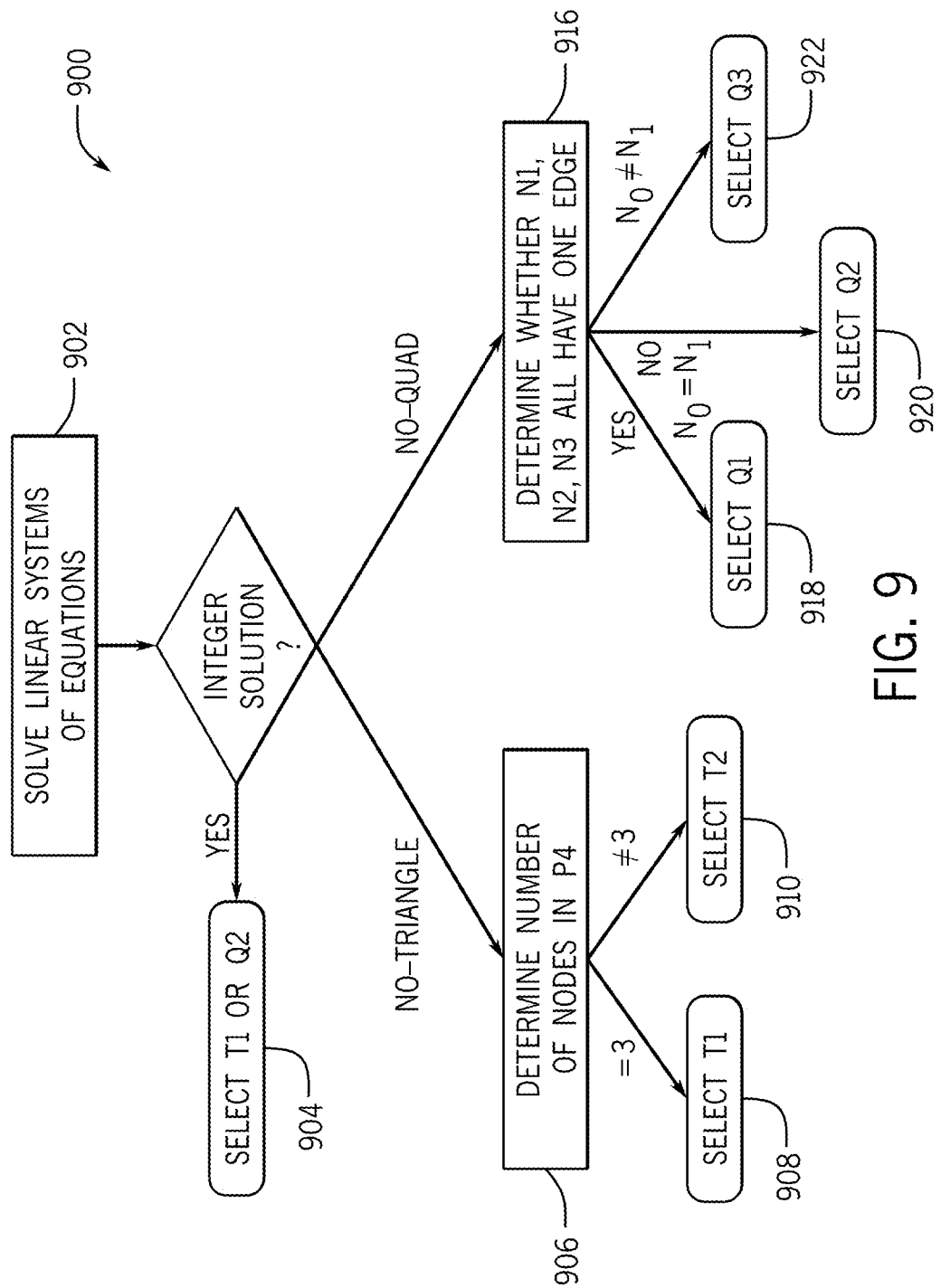
FIG. 9 is a flowchart of an exemplary method for selecting a minimum singularity template in accordance with the present disclosure.

Referring to FIG. 9, given a patch with 3, 4, or 5 sides, and a certain number of quad edges on each side, the system may perform a method 900 for automatically selecting a MST to represent the patch. At step 902, the system may check whether either system of equations for triangular or quadrilateral MRP gives an integer solution. If so, then the patch is quadrangulable with only one singularity and at step 904 the system may select either $T_1$ or $Q_2$ depending on the patch shape. If there is no integer solution, the system proceeds based on whether the patch is triangular or quadrilateral. If the patch is triangular, at step 906 the system may check the number of vertices in the sub-patch $P_4$. If there are three vertices on its first side, at step 908 the system may select the $T_1$ template; otherwise, at step 910 the system may select the $T_2$ template.

If the patch is quadrilateral, at step 916 the system may determine whether the patch's sides $N_1, N_2, N_3$ all have one edge; if so, at step 918 the system may select the $Q_1$ patch. If the number of edges on side $N_0$ and $N_1$ is equal and greater than one, at step 920 the system may select the $Q_2$ patch. If the number of edges on side $N_0$ and $N_1$ differ, at step 922 the system may select the $Q_3$ patch. If the patch is pentagonal, the system may decompose it into either quad-triangles pairs or in three triangular patches. Since there are many ways to decompose a pentagon, the system may check each decomposition for the number of singularities and accept the one which gives the least number of singularities.

Figure 10:
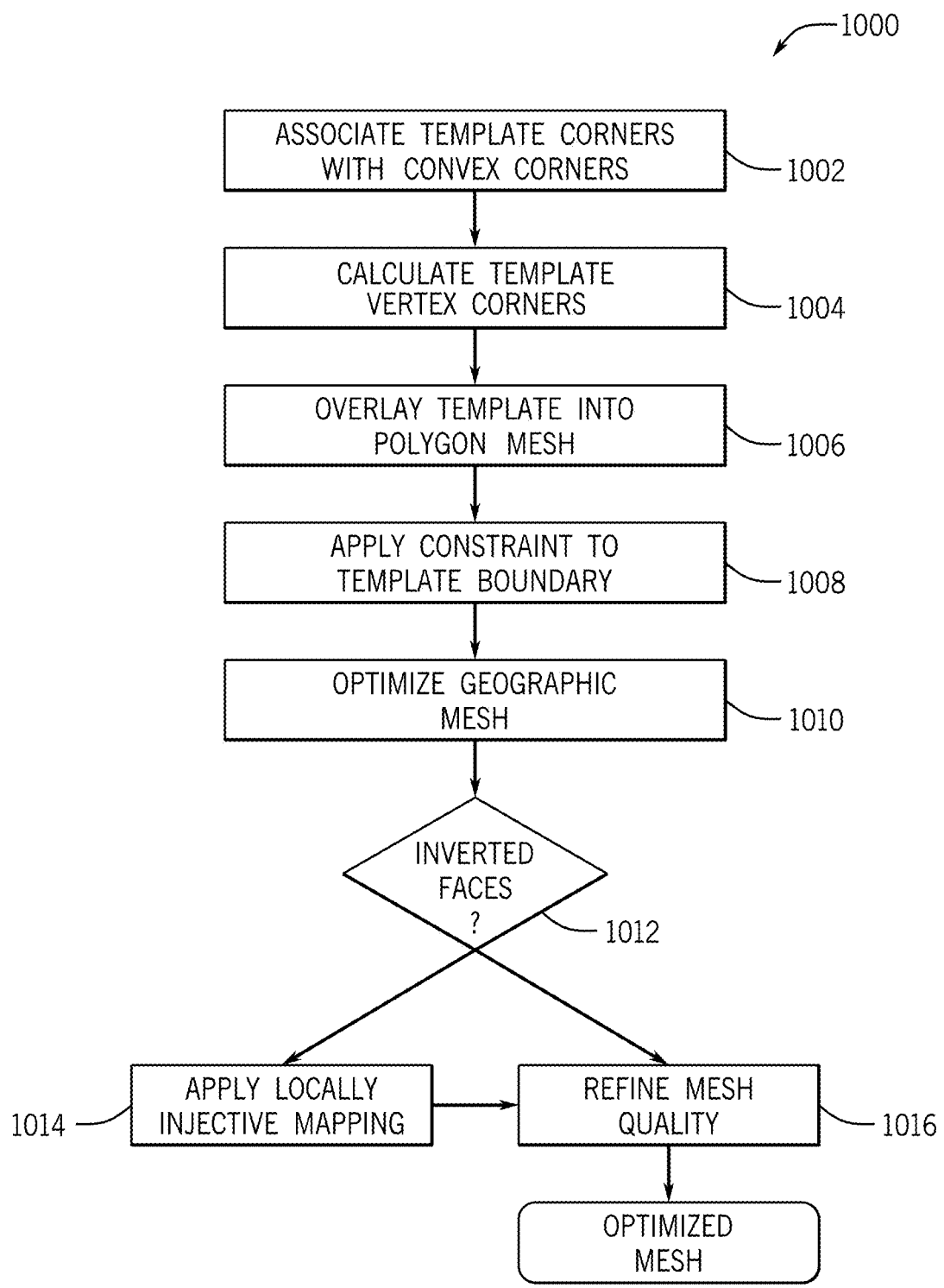
FIG. 10 is a flowchart of an exemplary method for replacing a patch of a polygon mesh with a minimum singularity template.

While the system can perform the combinatorial, algebraic steps above to resolve singularities, the final patch replacement may include geometric considerations as well. The shape of a patch could be arbitrarily complex (although it is always a topological disk); therefore, the mapping from template domain to physical domain can produce large distortions and inverted elements. FIG. 10 illustrates a method 1000 that the system may perform to replace a patch with the template mesh. At step 1002, the system may first create a correspondence between corners of the template patch with the convex corners of the patch to be replaced. That is, the system may associate each template corner with a corresponding convex corner. At step 1004, the system may calculate a set of coordinates, such as Floater's Mean Value Coordinates, for each vertex of the template mesh with respect to its corners; therefore, each vertex of the template mesh will have coordinates in n-dimensional space, where n is the number of convex corners.

At step 1006, the system may overlay the coordinates of the corners of the template mesh onto the coordinates of the identified patch and calculate the new coordinates of each vertex of the template mesh. At step 1008, the system may apply a constraint (i.e. Dirichlet boundary condition) on the boundary vertices of the template mesh using the corresponding boundary vertices on the physical patch. At step 1010, the system may optimize the patch using, e.g., Lloyds relaxation and improve the shape of quad elements, such as by using Mesquite software.

At step 1012, the system may check for inversion of each face in the template mesh. If there is an inverted face (i.e., the face has a negative Jacobian), at step 1014 the system may apply locally injective mapping (e.g., of Schueller, etc.) to obtain a fold-free mesh. At step 1016, if all the faces have positive Jacobian, the system may refine the mesh quality, using Mesquite or another suitable mesh node-moving software program to replace the identified patch with the template mesh, update the mesh data structures, and further integrate the selected MST into the optimized mesh.

Figure 11A:
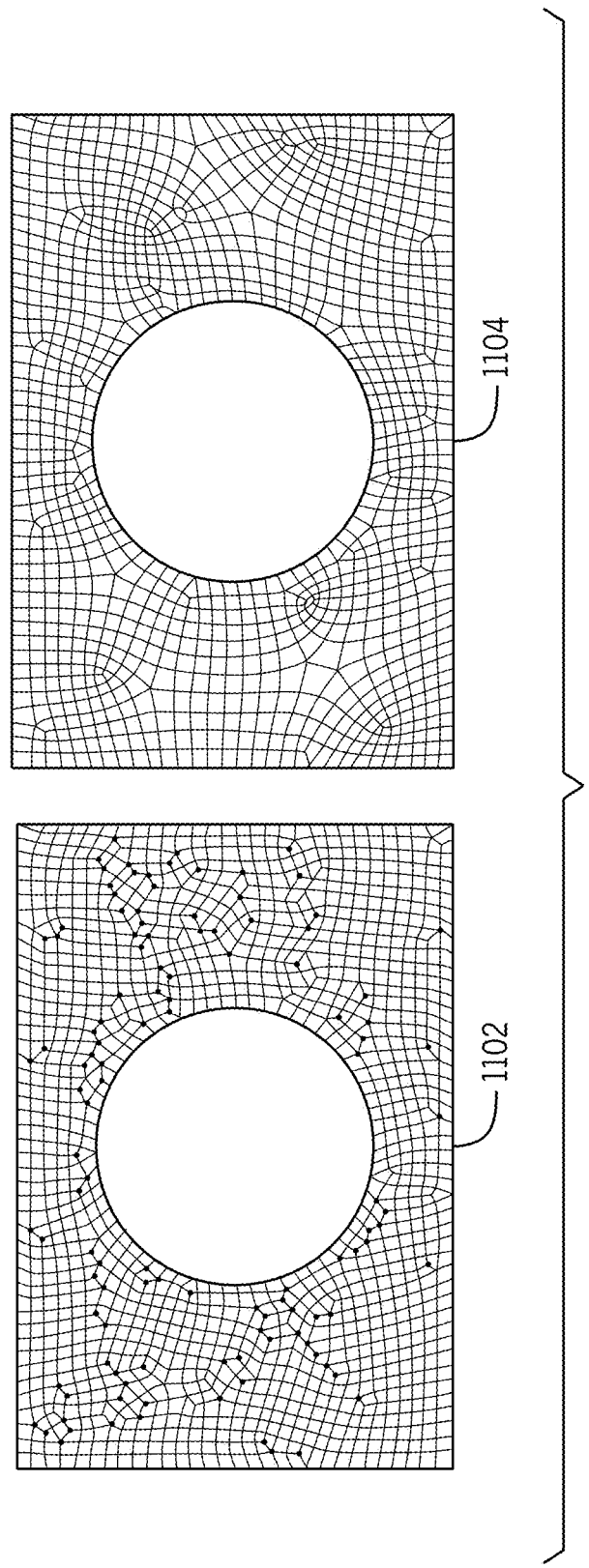
FIGS. 11A-D are exemplary optimizations of a polygon mesh for a computer graphic structure.
Figure 11B:
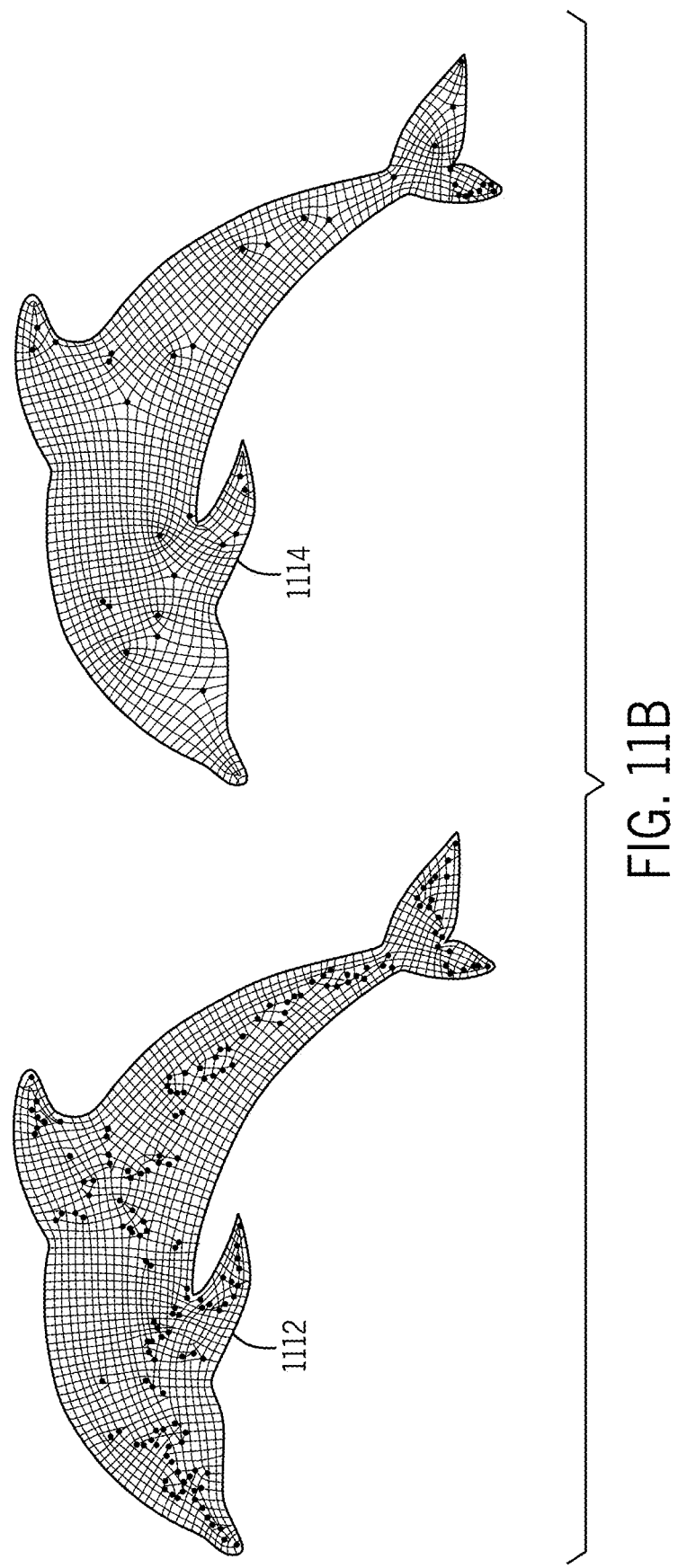
Figure 11C:
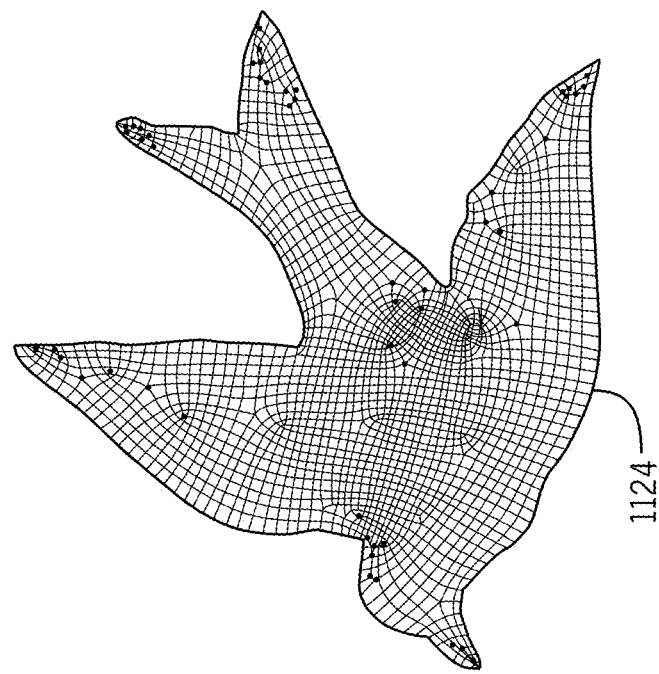
Figure 11C:
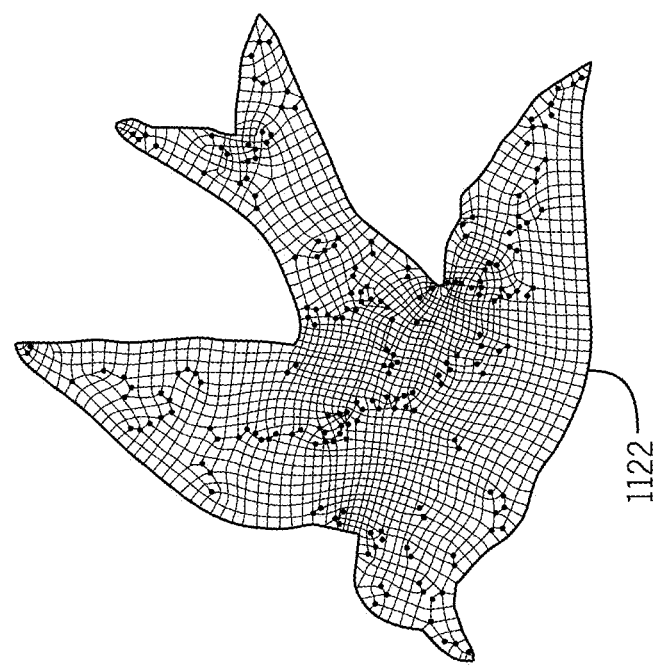
Figure 11D:
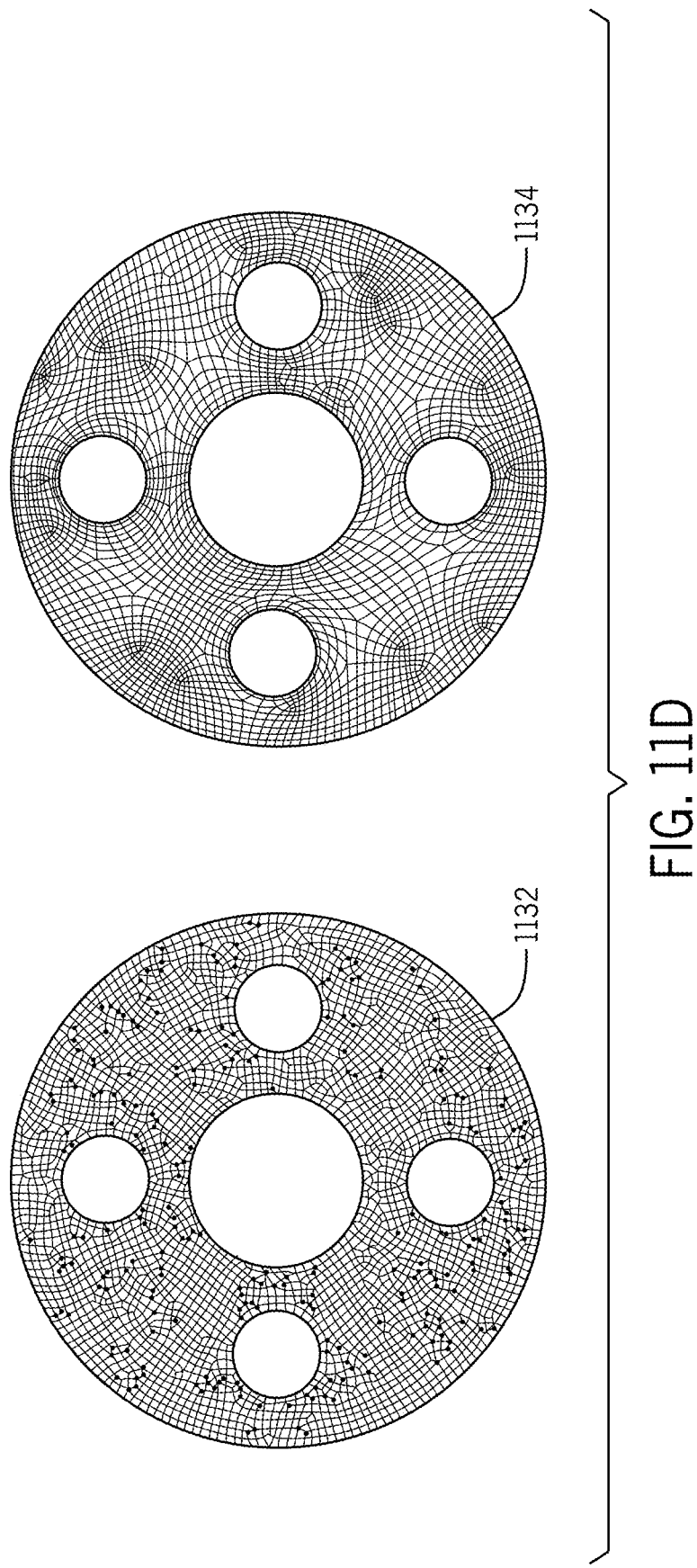

FIGS. 11A-D illustrate the potential results of performing the MST method on existing quad-meshes: in FIG. 11A, the Abaqus program was used to generate the quad-mesh 1102, and the MST method modified the quad-mesh 1102 to produce an optimized mesh 1104; in FIG. 11B, the Gmsh program was used to generate the quad-mesh 1112, and the MST method modified the quad-mesh 1112 to produce an optimized mesh 1114; in FIG. 11C, the Gmsh program was used to generate the quad-mesh 1122, and the MST method modified the quad-mesh 1122 to produce an optimized mesh 1124; and, in FIG. 11D, the Cubit program was used to generate the quad-mesh 1132, and the MST method modified the quad-mesh 1132 to produce an optimized mesh 1134. Table 3 lists the comparative results. In all cases, the number of quad faces remains almost constant, while at least 82% of singularities are removed. Although in all the experiments, the final mesh quality is within acceptable range (as defined by the Verdict Software), there are two ways to improve the results: (1) allow selective refinement near high aspect ratio elements, and (2) use $L_\infty$ shape optimization methods instead of average quality improvement methods.

TABLE 3

Mesh qualities using Verdict software; (x/y) denotes value of input mesh and output mesh respectively.

|  | Square hole | Dolphin | Bird | 5-holes |
|---|---|---|---|---|
| Source | Abaqus | Gmsh | Gmsh | Cubit |
| Faces | 4250/4015 | 5856/5586 | 2399/2271 | 9923/10085 |
| Singularities | 156/12(92%) | 474/38(92%) | 272/47(82%) | 627/70(89%) |
| # Iterations | 17 | 30 | 20 | 40 |
| Aspect Ratio (L) | 1.70/1.54 | 2.60/3.65 | 2.24/3.44 | 1.71/3.04 |
| Condition number (L) | 1.65/1.32 | 3.18/5.30 | 3.42/3.54 | 1.81/1.97 |
| Distortion (L) | 0.40/0.60 | 0.27/0.30 | 0.38/0.41 | 0.46/0.45 |
| MinAngle (L) | 48/57 | 32/24 | 25/22 | 46/37 |
| MaxAngle (H) | 140/126 | 155/162 | 158/159 | 140/145 |
| Oddy (L) | 3.39/1.5 | 18.31/54 | 21.46/23 | 4.56/5.78 |
| Scaled Jacobian (H) | 0.65/0.80 | 0.42/0.30 | 0.35/0.34 | 0.63/0.57 |
| Skew (L) | 0.58/0.40 | 0.74/0.86 | 0.83/0.88 | 0.66/0.68 |
| Stretch (L) | 1.04/1.26 | 15.03/23.2 | 12.81/18.0 | 1.45/2.06 |
| Taper (L) | 0.47/0.30 | 0.88/0.56 | 0.64/0.73 | 0.43/0.39 |

Figure 12:
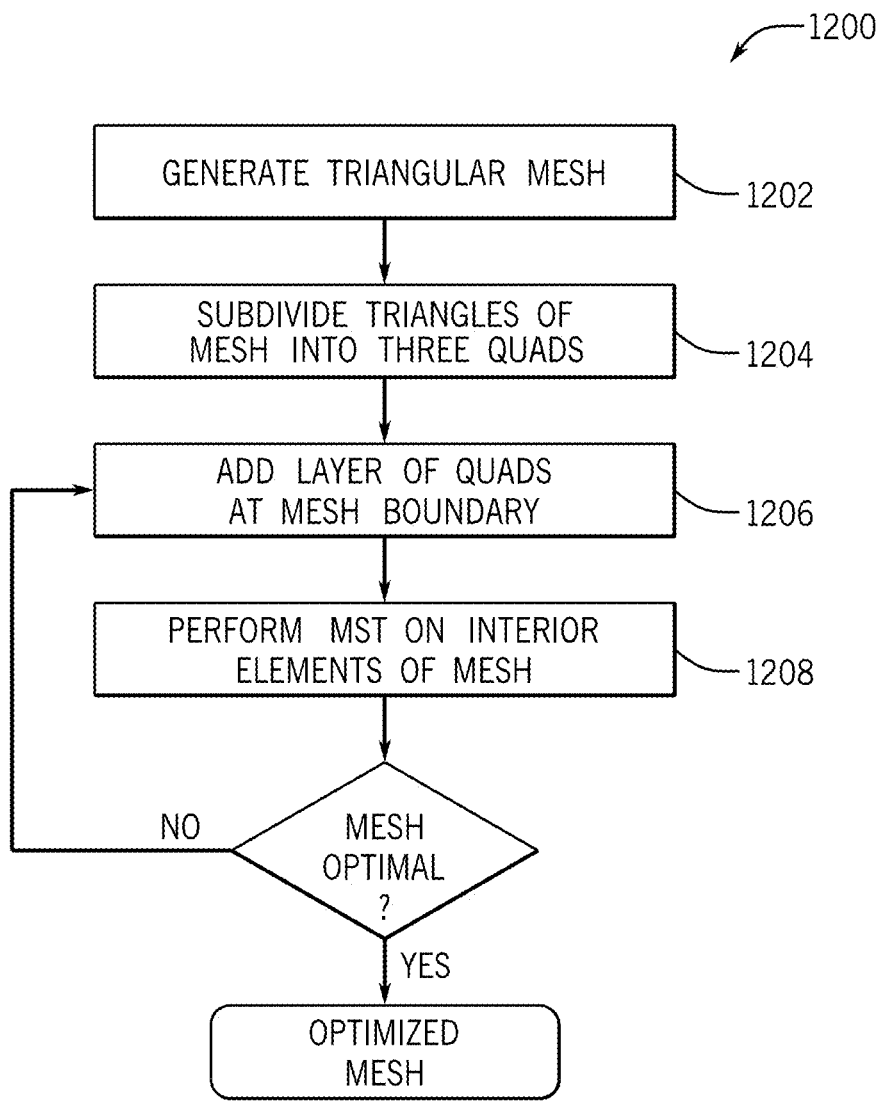
FIG. 12 is a flowchart of an exemplary method for generating a polygon mesh in accordance with the present disclosure.

Besides improving the quality of an existing quad mesh, this disclosure provides additional processes that exploit the above MST operations to (1) generate an ab-initio high-quality quadrilateral mesh in a complex domain, and (2) convert a quad-dominant mesh to a pure quadrilateral mesh. The first process is referred to herein as combinatorial quadrilateral mesh generation (CQM). FIG. 12 illustrates an exemplary CQM method 1200 that generates a mesh for a complex structure as described above. At step 1202, the system may generate a triangle mesh for the structure. Answers: The triangle mesh is a representation of the whole structure, and also functions as a seed mesh around which layers of quadrilateral elements are constructed as described below. There are several triangle mesh generators that are available; any of them can be used to generate the triangle mesh. The parameters of the seed mesh include, without limitation, the number of elements desired (at the final stage): the greater the number of elements desired, the finer is the mesh. At step 1204, the system may subdivide each triangle in the triangular mesh into three quadrilaterals in accordance with the presently-described algorithms.

At step 1206, the system may iteratively add layers of quadrilaterals at the boundaries of the mesh and integrate the new quadrilaterals into the mesh. These new layers exhibit ideal topological quality but require geometric optimization. These layers are added incrementally to control the maximum distortion in the final mesh. Experimentation has shown that typically 5-6 layers are sufficient; adding more layers will minimize distortion, but for thin regions, adding too many layers may not be possible. The layers push the quadrilateral elements of the initial mesh, which may have singularities (i.e., are not topologically ideal) inside the domain, allowing aggressive MST operations. At step 1208, such MST operations are applied to interior elements to reduce singularities in the mesh. If the MST operations result in a mesh with high distortion or if the mesh is coarse, new layers of quadrilaterals are inserted by returning to the previous step.

Figure 13:
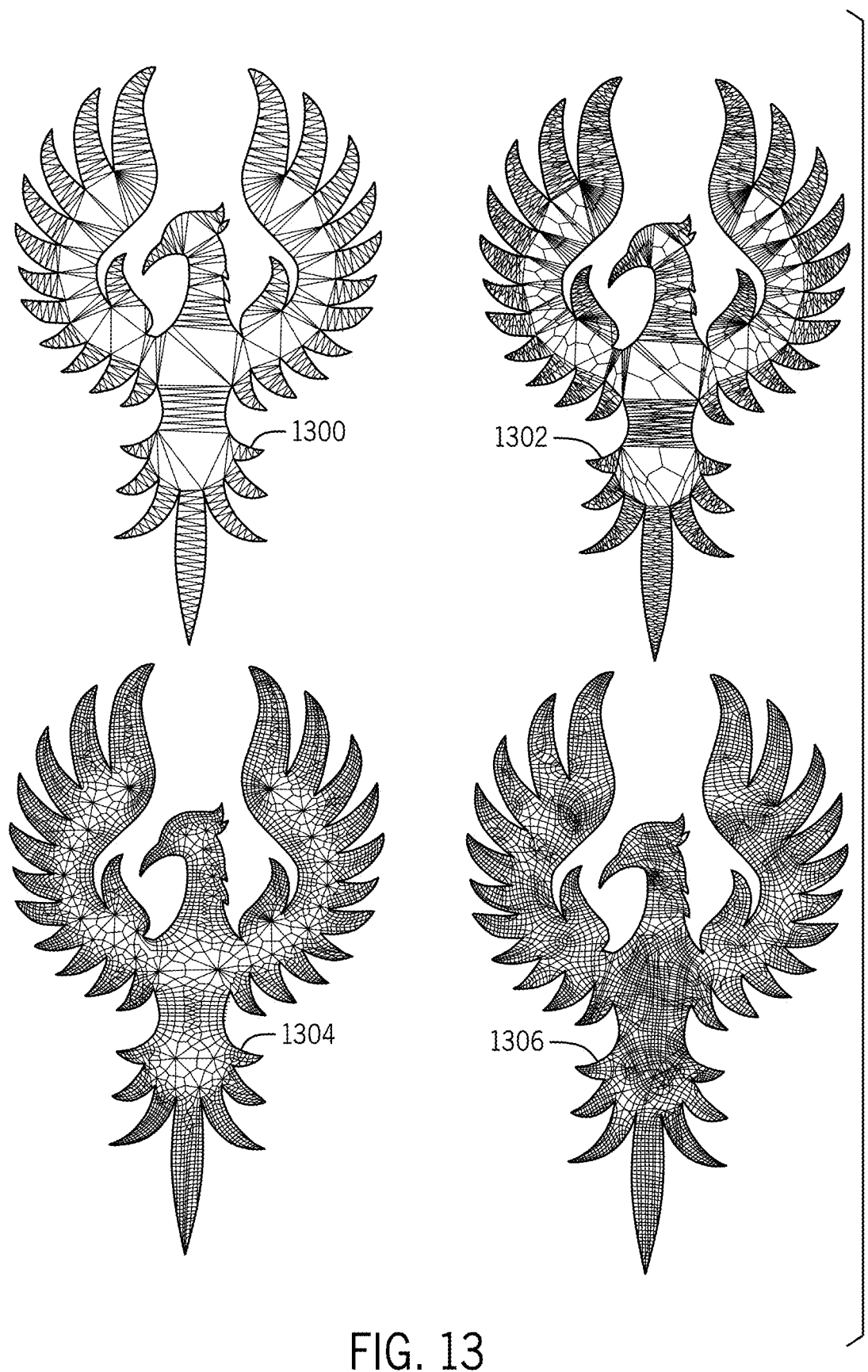
FIG. 13 is an exemplary optimization of a polygon mesh using the method of FIG. 12.

The CQM process 1200 of the present disclosure works with a quadrilateral mesh and only improves the existing topology of a quadmesh using MST operations. At every stage of the CQM process 1200, there is a topologically valid all-quadrilateral mesh. Thus, the parity (i.e., number of edges) of the boundary is always even. Additionally, CQM can exploit parallelism that exists in non-overlapping patches. In general, in the beginning, there are a large number of singularities in a mesh which are topologically far away, and the system can generate many independent patches. However, as the singularity reduction progresses, patches start overlapping and the scope of parallelism decreases. FIG. 13 provides a procedural illustration of the CQM process: a base triangular mesh 1300 is generated; each triangle is broken into three quads to form an initial quad-mesh 1302; a pillow function is performed to produce a first optimized mesh 1304 from the initial quad-mesh 1302; and, MST operations are performed to produce the final mesh 1306.

Figure 14:
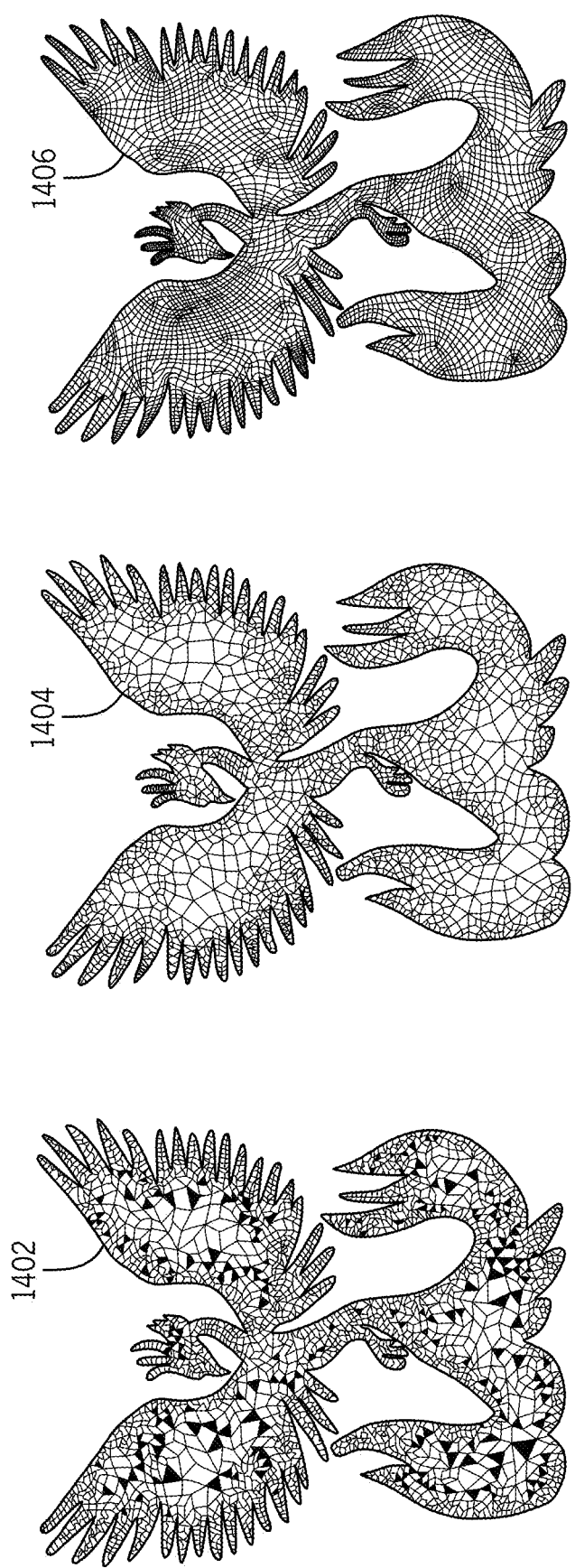
FIG. 14 is an exemplary optimization of a quad-heavy polygon mesh in accordance with the present disclosure.

According to the present disclosure, the system may also improve a quad-dominant mesh. A quad-dominant mesh contains a small number of non-quadrilateral elements (usually triangles and pentagons). In general, algorithms to generate quad-dominant meshes are much simpler and efficient than generating a pure quadmesh. However, the common techniques create large numbers of singularities and may add new operations, such as boundary splitting, which reduce the efficiency. The present disclosure includes a "far triangles agglomeration" (FTA) method that overcomes the drawbacks. In the FTA method, triangles are paired using Edmonds' Perfect Graph Matching algorithm as follows: (1) convert the quad-dominant mesh into a pure triangular mesh by dividing every quad element into two triangles, (2) construct a dual graph of the triangular mesh, (3) apply Edmonds' algorithm to match dual edges, and (4) form a new quadrilateral mesh from the triangles paired from dual edges. Once a pure quadrilateral mesh is obtained, the system may apply MST operations to reduce singularities in the mesh. FIG. 14 shows an example of a quad-dominant meshes 1402 with less than 10% triangle elements (using greedy triangles matching in triangular meshes). After applying Edmonds algorithm, these meshes are converted into a mesh 1404 of pure quads. The pure quad mesh contains a large number of singularities, so MST operations are applied to produce the improved mesh 1406.

The present invention has been described in terms of one or more preferred embodiments, and it should be appreciated that many equivalents, alternatives, variations, and modifications, aside from those expressly stated, are possible and within the scope of the invention.

What is claimed is:

1. A method of optimizing a computer graphic structure, the method comprising:

obtaining a polygon mesh representing the computer graphic structure, the polygon mesh comprising a plurality of polygonal faces and a plurality of vertices each located at an intersection of at least two of the faces, wherein some of the plurality of vertices are singularities;

determining, based on a first singularity of the plurality of vertices, a patch of the polygon mesh, the patch containing the first singularity and having a first boundary;

selecting, based on one or more characteristics of the patch, a first minimum singularity template (MST) of a plurality of MSTs each representing a corresponding quadmesh that has three or fewer singularities;

replacing, within the polygon mesh, the patch with the first MST to produce an optimized polygon mesh representing the computer graphic structure, the optimized polygon mesh comprising fewer singularities than the polygon mesh;

wherein selecting the first MST comprises:

dividing the patch into a plurality of sub-patches, wherein a first sub-patch of the plurality of sub-patches is a maximally reduced patch (MRP) having an even number of edges and a first side defined by exactly one of the even number of edges; and selecting the first MST based at least in part on the first sub-patch.

2. The method of claim 1, wherein obtaining the polygon mesh comprises:

generating a triangular mesh for the structure;

subdividing each triangle in the triangular mesh into three quadrilaterals to produce a quadmesh with no singularities; and adding one or more layers of new quadrilaterals into the quadmesh to produce the vertices that are singularities.

3. The method of claim 1, wherein determining the patch comprises identifying, as a second singularity, the vertex of the plurality of vertices that is the topologically closest singularity to the first singularity, the patch containing the second singularity.

4. The method of claim 3, wherein identifying the second singularity comprises performing a Dijkstra shortest distance search from the first singularity.

5. The method of claim 1, wherein selecting the first MST comprises:

determining that the patch is triangular; and selecting the first MST from the plurality of MSTs comprising:

a first triangular MST for a triangular patch, the first triangular MST having one internal singularity; and a second triangular MST for the triangular patch, the second triangular MST having two internal singularities.

6. The method of claim 5, wherein obtaining the first polygon mesh comprises:

receiving a quad-dominant mesh comprising a plurality of quadrilaterals and a plurality of non-quadrilateral elements;

converting the quad-dominant mesh into a triangular mesh;

matching dual edges of the triangular mesh; and forming the first polygon mesh from triangles of the triangular mesh that are paired from dual edges.

7. The method of claim 1, wherein selecting the first MST comprises:

determining that the patch is quadrilateral; and selecting the first MST from the plurality of MSTs comprising:

a first quadrilateral MST for a quadrilateral patch, the first quadrilateral MST having two internal singularities;

a second quadrilateral MST for the quadrilateral patch, the second quadrilateral MST having one internal singularity; and a third quadrilateral MST for the quadrilateral patch, the third quadrilateral MST having three internal singularities.

8. The method of claim 1, wherein replacing the patch with the first MST comprises:

aligning each corner of a plurality of corners of the first MST with a corresponding convex corner of a plurality of convex corners of the patch;

calculating a set of coordinates for each quadmesh vertex of a plurality of quadmesh vertices of the first MST; and overlaying, using the correspondence between corners and the sets of coordinates, the quadmesh of the first MST onto the polygon mesh.

9. The method of claim 1, wherein obtaining the polygon mesh comprises:

receiving a quad-dominant mesh comprising a plurality of quadrilaterals and a plurality of non-quadrilateral elements;

converting the quad-dominant mesh into a triangular mesh;

matching dual edges of the triangular mesh; and forming the polygon mesh from triangles of the triangular mesh that are paired from dual edges.

10. A method for optimizing a computer graphic structure, the method comprising:

obtaining, by a computing device, a first polygon mesh representing the computer graphic structure, the polygon mesh comprising a plurality of polygonal faces and a plurality of vertices each located at an intersection of at least two of the faces, the plurality of vertices including a plurality of singularities;

identifying a first singularity of the plurality of singularities;

identifying, using the first singularity, a second polygon mesh comprising a first subset of the plurality of faces and containing the first singularity, a second singularity of the plurality of singularities, and a third singularity of the plurality of singularities;

selecting, based on one or more characteristics of the second polygon mesh, a first minimum singularity template (MST) of a plurality of MSTs each representing a corresponding quad-mesh of a plurality of pre-configured quadmeshes each having three or fewer singularities, the first MST corresponding to a third polygon mesh;

replacing, within the first polygon mesh, the second polygon mesh with the third polygon mesh to produce an optimized polygon mesh representing the computer graphic structure, the optimized polygon mesh comprising fewer than the plurality of singularities;

wherein selecting the first MST comprises:

dividing the second polygon mesh into a plurality of sub-patches, wherein a first sub-patch of the plurality of sub-patches is a maximally reduced patch (MRP) having an even number of edges and a first side defined by exactly one of the even number of edges; and selecting the first MST based at least in part on the first sub-patch.

11. The method of claim 10, wherein obtaining the first polygon mesh comprises:

generating a fourth polygon mesh for the structure, the fourth polygon mesh comprising a plurality of triangular faces;

subdividing each triangular face in the fourth polygon mesh into three quadrilaterals to produce a quadmesh with no singularities; and adding one or more layers of new quadrilaterals into the quadmesh to produce the first polygon mesh.

12. The method of claim 10, wherein identifying the second polygon mesh comprises identifying, as the second singularity, the vertex of the plurality of vertices that is the topologically closest singularity to the first singularity.

13. The method of claim 12, wherein identifying the second singularity comprises performing a Dijkstra shortest distance search from the first singularity.

14. The method of claim 10, wherein identifying the second polygon mesh further comprises identifying the third singularity using a breadth-first search of the plurality of vertices that begins at a first vertex disposed between the first singularity and the second singularity.

15. The method of claim 10, wherein selecting the first MST comprises:

determining that the first sub-patch is triangular; and selecting the first MST from the plurality of MSTs comprising:

a first triangular MST for a triangular patch, the first triangular MST having one internal singularity; and a second triangular MST for the triangular patch, the second triangular MST having two internal singularities.

16. The method of claim 10, wherein selecting the first MST comprises:

determining that the first sub-patch is quadrilateral; and selecting the first MST from the plurality of MSTs comprising:

a first quadrilateral MST for a quadrilateral patch, the first quadrilateral MST having two internal singularities;

a second quadrilateral MST for the quadrilateral patch, the second quadrilateral MST having one internal singularity; and a third quadrilateral MST for the quadrilateral patch, the third quadrilateral MST having three internal singularities.

17. The method of claim 10, wherein replacing the second polygon mesh with the third polygon mesh comprises:

aligning each corner of a plurality of corners of the third polygon mesh with a corresponding convex corner of a plurality of convex corners of the second polygon mesh;

calculating a set of coordinates for each quadmesh vertex of a plurality of quadmesh vertices of the third polygon mesh; and overlaying, using the correspondence between corners and the sets of coordinates, the quadmesh of the third polygon mesh onto the first polygon mesh.

* * * * *